United States Patent [19]
Pollock

[11] Patent Number: 5,875,882
[45] Date of Patent: Mar. 2, 1999

[54] AUGER DRIVE AND METHOD OF DRIVING AN AUGER

[75] Inventor: Eugene B. Pollock, Shelby County, Ill.

[73] Assignee: The GSI Group, Assumption, Ill.

[21] Appl. No.: 708,649

[22] Filed: Sep. 5, 1996

Related U.S. Application Data

[60] Provisional application No. 60/003,408 Sep. 8, 1995.

[51] Int. Cl.⁶ .......................... B65G 33/34; B65G 33/26; B65G 33/32
[52] U.S. Cl. .......................... 198/674; 198/659; 198/660; 198/666; 198/667; 198/677; 198/670
[58] Field of Search .................................... 198/659, 660, 198/666, 667, 670, 674, 677

[56] References Cited

U.S. PATENT DOCUMENTS

| | | | |
|---|---|---|---|
| 983,070 | 1/1911 | Lindner . | |
| 2,045,757 | 6/1936 | Constantin | 198/659 |
| 2,232,606 | 2/1941 | Hudson . | |
| 2,234,504 | 3/1941 | Robinson et al. . | |
| 2,297,167 | 9/1942 | Robinson et al. . | |
| 2,908,379 | 10/1959 | Hamilton | 198/659 |
| 3,003,464 | 10/1961 | Bailey . | |
| 3,178,210 | 4/1965 | Dickinson . | |
| 3,198,320 | 8/1965 | Mayrath et al. . | |
| 3,230,933 | 1/1966 | Myers et al. . | |
| 3,249,210 | 5/1966 | Mayrath et al. . | |
| 3,415,228 | 12/1968 | Myers . | |
| 3,978,978 | 9/1976 | Herter . | |
| 4,640,230 | 2/1987 | Van Rooijen . | |
| 5,002,421 | 3/1991 | Vrieze . | |
| 5,113,227 | 5/1992 | Miyasaka . | |
| 5,183,147 | 2/1993 | Callahan et al. . | |
| 5,311,839 | 5/1994 | Pollock et al. . | |
| 5,335,619 | 8/1994 | Pollock . | |

Primary Examiner—James R. Bidwell
Assistant Examiner—Joe Dillon, Jr.
Attorney, Agent, or Firm—Polster, Lieder, Woodruff & Lucchesi, L.C.

[57] ABSTRACT

A drive (D) for an auger conveyor (FC) is disclosed where the auger conveyor comprises a conveyor conduit (11) and a centerless helical coil auger (15) disposed within the conduit. The auger has a longitudinal axis and a plurality of spaced, helical flights (17). The drive (D) is a drive screw (23) substantially coaxial with the auger and having a plurality of flights in face-to-face engagement with corresponding flights of the auger. A drive member (47) is in driving engagement with the drive screw with the drive screw and the drive member being mounted for rotation about the longitudinal axis. A power drive (27) is rotatably drives the drive screw about its longitudinal axis so as to effect movement (either axial or rotational movement) of the auger relative to the conveyor conduit. A method of driving the auger is also disclosed.

8 Claims, 11 Drawing Sheets

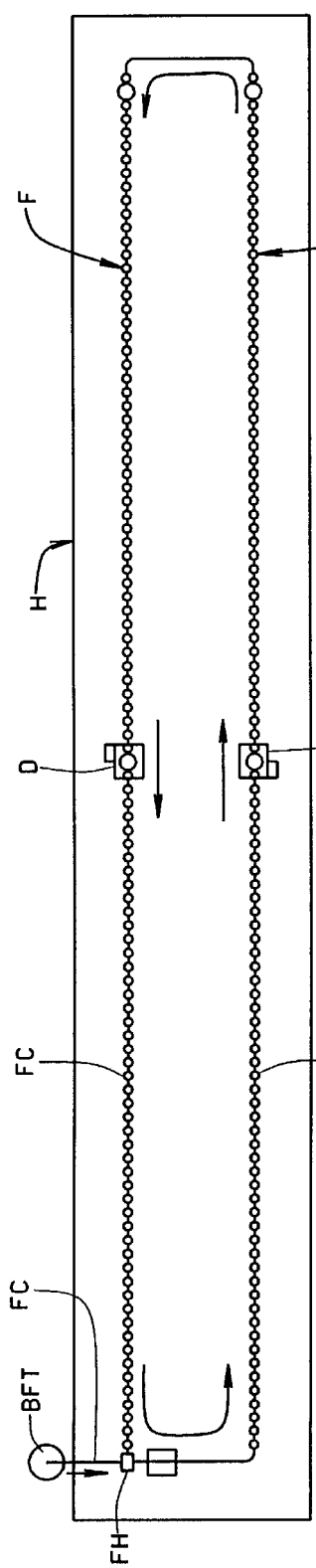
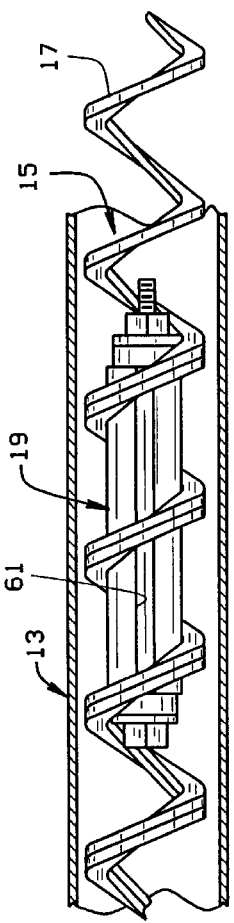
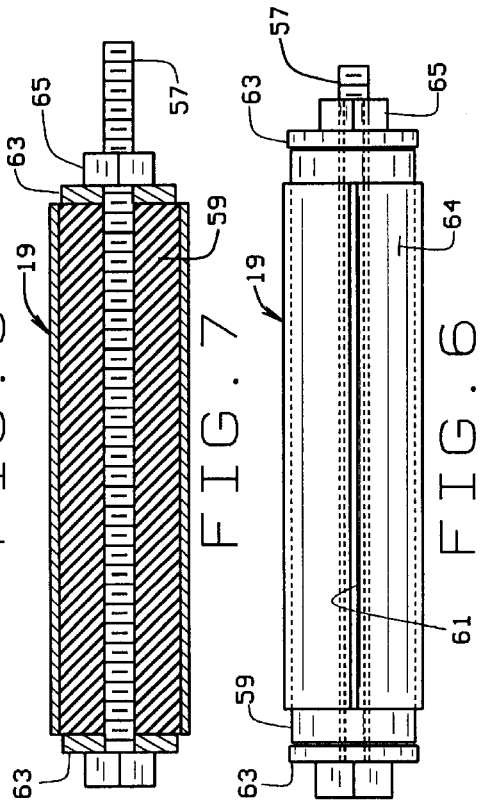
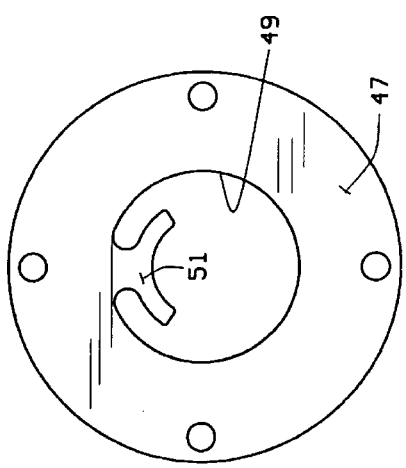

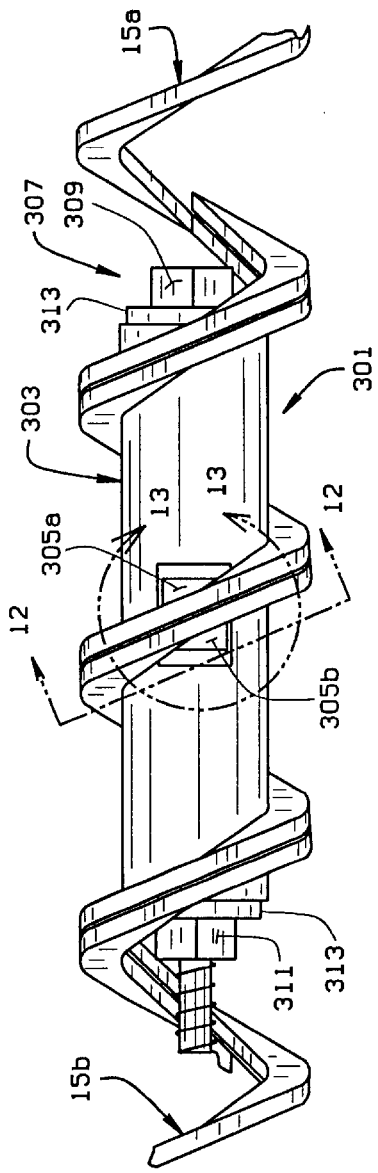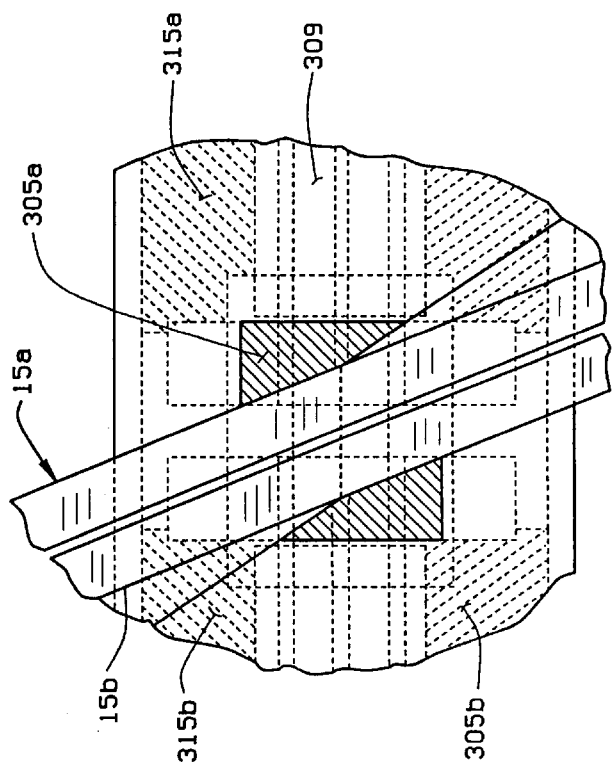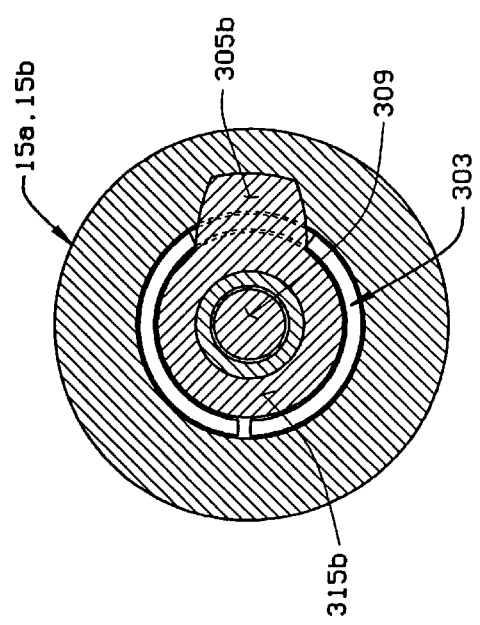

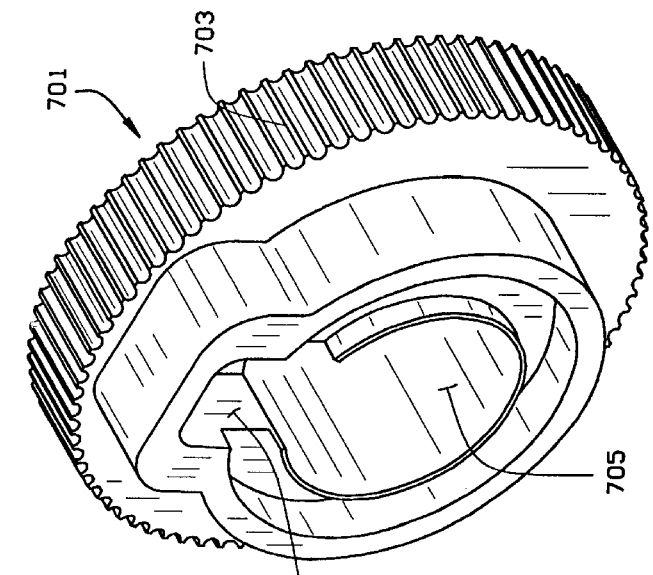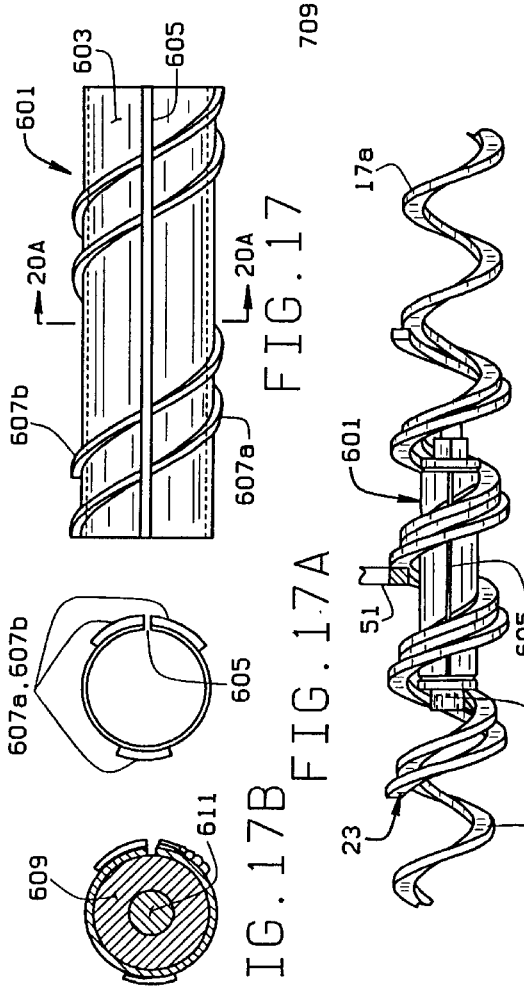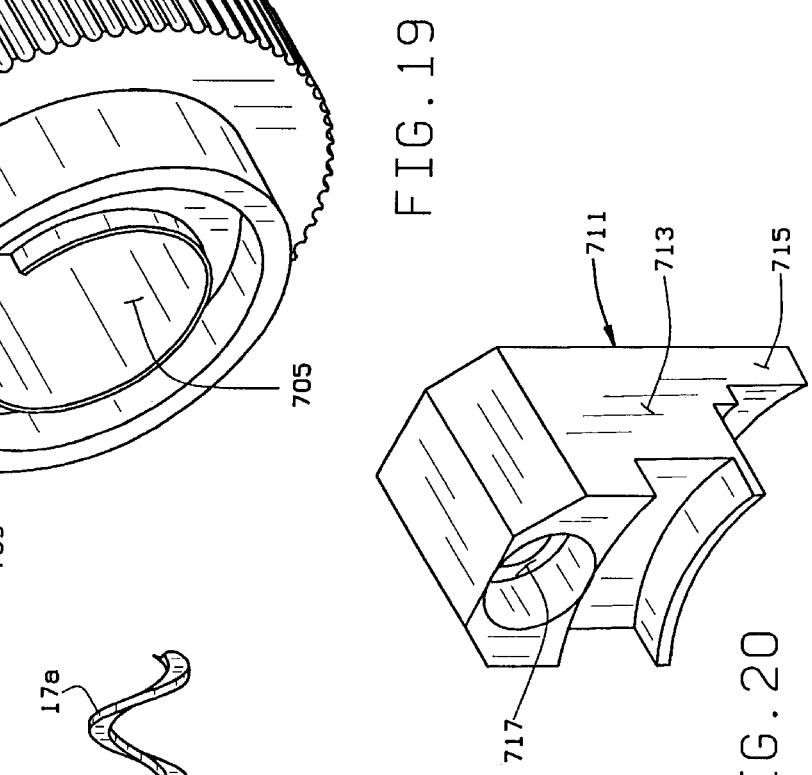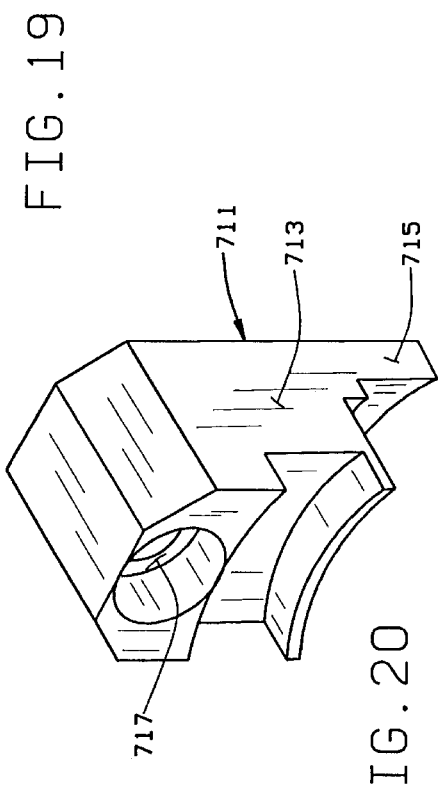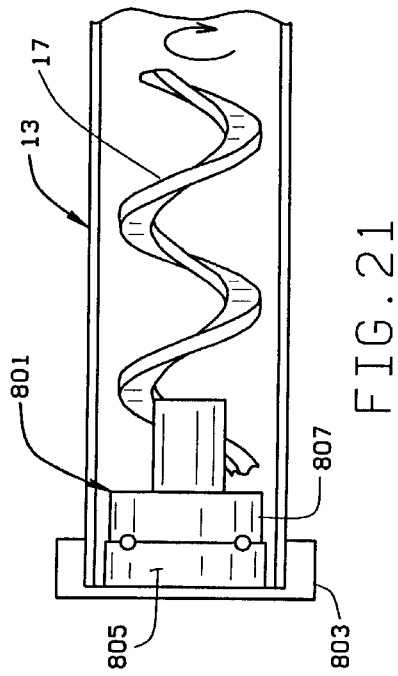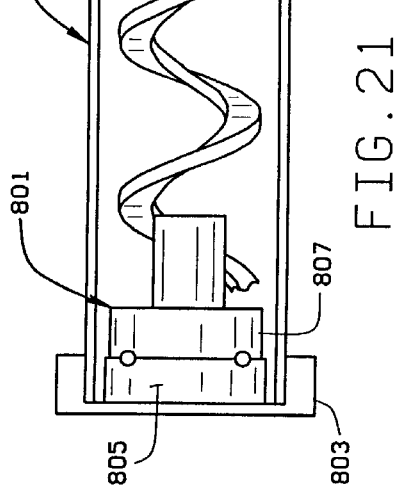

AUGER DRIVE AND METHOD OF DRIVING AN AUGER

Cross Reference to a Related Provisional Application

This non-provisional application claims the benefit of U.S. Provisional Patent Application No. 60/003,408, filed Sep. 8, 1995 entitled "Auger Drive and Method of Driving An Auger".

BACKGROUND OF THE INVENTION

This invention relates to a drive for an auger conveyor of the type which is used to convey feed (or other granular, or powdered, or fluent material) from a bulk feed tank or (other storage container or vessel) to a number of feeders in a poultry or hog house. Typically, such auger conveyors comprise a conduit, which may be a closed tube or and open trough, or a combination of lengths of closed tubes and open troughs, and a "centerless" auger disposed within the conduit. Generally, a centerless auger comprises an open helical coil which does not have a center shaft. The auger is formed of a single elongate wire or rod (which may be either of round or rectangular cross section) which is formed into an open helical coil arrangement having a multiplicity of spaced flights, with the flights being spaced from one another at substantial equal distances from one another. The spacing of the flights from one another is oftentimes referred to as the pitch of the auger. Such centerless augers are advantageous because without a center shaft, they may readily go around turns and can accommodate changes in elevation.

Such auger conveyors are driven by a motor so as to convey feed in axial direction along the conveyor conduit from the supply of feed to distribute the feed to one or more feeders located along the conduit. As shown in the co-assigned U.S. Pat. No. 5,311,839, and in U.S. Pat. Nos. 3,230,933 and 3,415,228, such centerless feed augers may rotate within their respective conduits by means of an electric motor located at one end of the conduit. In this manner, the auger acts like a screw conveyor to move feed axially within the conduit as the auger is rotated. In other feeding systems, the feed conveyor (i.e., the conduit and the centerless auger therein) is arranged in an endless loop with a plurality of feeders located along the loop for conveying feed from a feed source (e.g., a feed hopper) to the feeders along the loop. In such endless loop feed auger conveyors, one or more lengths of a centerless auger are joined together in end-to-end fashion and the endless centerless auger is axially propelled through the conduit so that the flights of the auger axially drag or push feed axially through the conduit. In U.S. Pat. Nos. 2,232,606 and 3,003,464, the auger is shown to be entrained around a drive wheel which in turn is rotated by a motor so as to move the auger axially through a tube to convey a granular material through the tube. As shown in U.S. Pat. No. 4,640,230, an endless, centerless auger may be axially propelled through a conveyor conduit by a gear in mesh with the flights of the auger. The gear was driven by an appropriate gear motor (i.e., an electric motor with a built in gear speed reducer) such that one tooth of the gear engages a respective flight of the auger as the gear is rotated in a radial plane containing the longitudinal axis of the auger. In this manner, the auger is propelled in axial direction through the conduit. While such gear drives work well for their intended purposes, they have certain shortcomings.

In addition, U.S. Pat. Nos. 3,198,320 and 3,249,210 describe center driven drives for rotary augers having a center shaft may be of interest. However, these patents have no disclosure or suggestion of how such a drive could propel an auger axially within a feed conveyor tube.

When such centerless augers are installed in a closed loop conveyor conduit, it is necessary to join the ends of the auger segments for form an endless auger. This may be done by welding or (more commonly) brazing the overlapping ends of the auger together. It is also known that the ends of the auger segments may be joined together by means of mechanical couplers. Reference may be made to U.S. Pat. No. 5,002,421 for a description on one such prior art mechanical auger section connector. However, such prior art auger connectors had certain drawbacks, particularly for use with axial drives for such endless loop augers.

SUMMARY OF THE INVENTION

Among the several objects and features of the present invention may be noted the provision of a drive for a centerless auger conveyor in which the centerless auger may be driven either in axial direction or in rotary direction relative to the conveyor conduit for conveying feed or other dry fluent or powdered material through the conveyor conduit;

The provision of such a drive in which the auger is propelled in axial direction through the conduit, or in which the auger may be rotary driven within the conduit by means of an axially oriented drive screw which is coaxial with the auger.

The provision of such a drive in which the drive screw is in engagement with a number of the flights of the auger so that the driving force is distributed over a number of flights of the auger and the drive screw thereby to lessen the force applied to any one of the flights of the auger and of the drive screw, and to prevent the imposition of point impact drive loads on the auger which may cause breakage of the auger or the drive;

The provision of such a drive in which the ends of two or more auger sections may be joined together to form an endless loop either by brazing (welding) or by a mechanical coupler, and yet the drive does not interfere with joint or the coupler as the latter moves past the drive;

The provision of such a drive in which the drive speed with which an axially propelled auger is driven through a feed conveying system may be readily and inexpensively varied within a desired range, and which does not require an expensive gear motor drive;

The provision of a coupler for joining two section of such centerless auger together with one or more flights of the auger sections overlapping one another and with the coupler releasably joining the auger sections together;

The provision of such a drive which may be used to either axially propel the auger though its conveyor tube such that the axially movable auger conveys feed axially within the conveyor tube or to rotatably drive the auger within the conveyor tube without substantial axial movement of the auger relative to the conveyor tube such that the rotating auger functions as a screw conveyor to move feed or the like axially through the conveyor; and The provision of such a drive which is of simple and inexpensive construction, which is quiet in operation, and which has a reliable and long service life.

Briefly stated, this invention relates to a drive for an auger conveyor. The auger conveyor comprises a conveyor conduit and centerless auger disposed within the conduit. The auger has a longitudinal axis and a plurality of flights spaced apart from one another at generally equal intervals along the longitudinal axis. The drive comprises a drive member in driving engagement with the auger. The drive member is rotatably driven about an axis parallel to the longitudinal axis of the auger such that rotation of the drive member effects movement (either rotary if the auger is held fixed in axial position or axial if the auger is free to move in axial direction within the conduit) relative to the conveyor conduit.

In another embodiment of the drive of the present invention, the drive member is a drive screw substantially parallel to (preferably but not necessarily coaxial with) the axis of the auger. The drive screw has a plurality of flights spaced apart from one another. One or more of the drive screw flights are at least in part in face-to-face engagement with corresponding flights of the auger. A drive member is in driving engagement with the drive screw and the drive screw and the drive member are mounted for rotation about the longitudinal axis. A power drive is provided for rotating the drive member and the drive screw about the longitudinal axis of the drive screw such that rotation of the drive screw effects movement (either rotary or axial movement) of the auger relative to the conveyor conduit.

The method of this invention relates to a method of driving an auger within an auger conduit for axially conveying feed or other material through the auger conduit. The method comprises the steps of providing a drive screw within the auger conduit, the drive screw being parallel to the axis of a portion of the auger. Then, the drive screw is rotated about its longitudinal axis so as to impart motion to the auger.

A coupler of the present invention is described for joining two segments of a helical auger in end-to-end relation. Each the auger segment comprises a length of rod or other shape stock wound in an open coil, helical configuration having a central opening and a plurality of flights spaced at substantially equal axial intervals along the auger with the ends of the auger segments being overlapped with at least one flight of each auger segment being in face-to-face engagement with a flight of the other auger segment. The coupler comprises a body of elastomeric material sized to fit within the central opening of the auger segments, and means for axially compressing the elastomeric body in axial direction so as to radially expand the sleeve into gripping engagement with the auger sections thus joining the auger segments together.

Other objects and features of this invention will be in part apparent and in part pointed out hereinafter.

BRIEF DESCRIPTION OF THE DRAWINGS

FIG. 1 is a plan view of an animal husbandry (poultry) house having an endless loop feed conveyor for conveying feed from a bulk feed tank or other feed supply to a multiplicity of feeders disposed along the feed conveyor by an endless auger disposed within a feed conduit with the auger being driven or propelled in axial direction within the conduit by a drive of the present invention;

FIG. 4 is a cross section view taken along line 4—4 of FIG. 2 showing a drive plate coupled to the drive screw for causing the later to be rotatably driven about its longitudinal axis upon rotation of the drive plate;

FIG. 5 (see sheet 1) illustrates a coupler of the present invention for connecting two segments of the centerless feed auger in overlapped end-to-end relation with one another;

FIG. 6 is a somewhat enlarged view of the coupler in a relaxed or uncompressed condition in which the coupler may be installed within the central openings of overlapped sections of adjoining auger sections, as shown in FIG. 5;

FIG. 7 is a cross sectional view of FIG. 6 showing the coupler in its compressed state in which, upon tightening of a bolt in axial direction, causes the coupler to expand in radial direction so as to forcefully grip the inner reaches of the overlapped auger sections and to thus positively interlock the auger sections in coupled relation;

FIG. 11 is a view similar to FIG. 8 illustrating still another embodiment of the auger coupler of the present invention in which metal inserts disposed within a split sleeve have rigid protrusions which engage opposite faces of the overlapped auger flights and which securely clamp the auger flights in fact-to-face clamping engagement upon a center bolt being tightened;

FIG. 12 is an enlarged cross section view taken along line 12—12 of FIG. 11 illustrating details of construction of the coupler shown in FIG. 11;

FIG. 13 is an enlarged view taken along line 13—13 of coupler of FIG. 11 illustrating how movable clamping protrusions clamp the auger flights in face-to-face engagement.

FIG. 17 is a side elevational view of another embodiment of a coupler, similar to that shown in FIGS. 5–8, having a raised spiral groove on the outer surface thereof for receiving the flights of the overlapped auger sections with the spiral grooves forcing the overlapped auger sections into firm face to face engagement with one another;

FIG. 17A is a cross-sectional view of the coupler body shown in FIG. 17 illustrating the coupler having a longitudinal split therein and further showing the arrangement of the spiral grooves formed on the outside of the tubular coupler body;

FIG. 17B is a view similar to FIG. 17A illustrating the coupler body having a body of compressible, expandable elastomeric material (e.g., urethane) therein with a through bolt therethrough;

FIG. 18 is a view of the coupler installed within the bores of two overlapped sections of auger to be joined together further showing a drive screw in driving engagement with the overlapped auger sections and illustrating that the connector is free to move past the drive member driving the drive screw;

FIG. 19 is a perspective view of a toothed belt sprocket to be driven by the belt and sprocket drive similar to that shown in FIG. 14 where the sprocket is of synthetic resin having a journal bearing of suitable plastic bearing material in place of the rolling element anti-friction bearing shown in FIG. 1;

FIG. 20 is a perspective view (on an enlarged scale relative to FIG. 19) of a drive element received within a corresponding slot or socket within the drive sprocket for being rotatably driven by the drive sprocket with the drive element extending radially inwardly from the drive sprocket for engagement with a face of the drive screw so as to impart a force on the auger to drive the latter within the conveyor tube;

FIG. 21 is a view of an end portion of an auger section journalled by a rotary anti-friction bearing for being held in fixed axial position with respect to its conveyor tube but journalled for rotation about its longitudinal axis by the drive of this invention, as shown in FIG. 10;

Corresponding reference characters indicated corresponding parts throughout the several views of the drawings.

DESCRIPTION OF PREFERRED EMBODIMENTS

Figure 2:
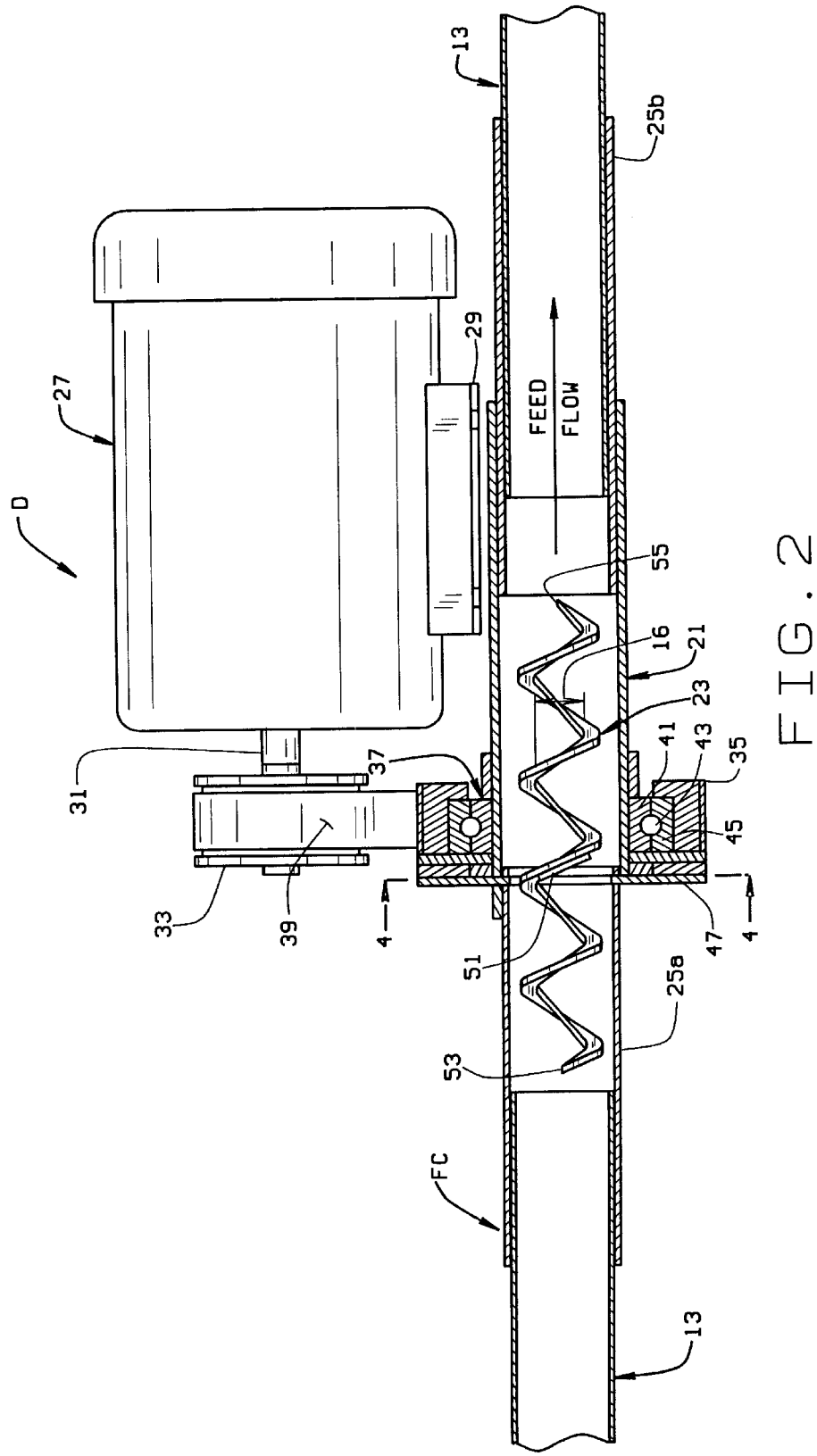
FIG. 2 is a side elevational view of a portion of the feed conveyor illustrated in FIG. 1 showing the drive of the present invention for axially propelling a feed conveying auger (not shown in FIG. 2) through the feed conduit, and particularly illustrating a drive screw driven by an electric motor for driving the feed auger relative to the conveyor conduit.

Referring now to the drawings, and more particularly to FIG. 1, an animal husbandry house, and more particularly a poultry house H, is shown in plan view having a feed conveyor FC therein for conveying bulk feed (or other dry, flowable material) from a bulk feed tank BFT or other storage vessel located, for example, on the exterior of the poultry house to a multiplicity of feeders F within the poultry house for being consumed by the birds within the house. Feed conveyed from bulk feed tank BFT is loaded into feed hoppers FH which may be of the type described in my co-assigned U.S. Pat. No. 5,335,619. The feeders F, for example, may be pan type poultry feeders, such as are described in my co-assigned U.S. Pat. No. 5,311,839. As shown in FIG. 1, feed conveyor FC is arranged in an endless loop within poultry house H and the feed conveyor is driven by one or more conveyor drives of the present invention, as generally indicated at D. However, as will be hereinafter described, the drive of this invention need not be used with such endless loop conveyors in which the auger is axially driven through the conveyor tube, but the drive D of this invention may be used to rotatably drive the auger within its conveyor tube without substantial axial movement of the auger within the conveyor tube. Further, while the feed conveyor FC is shown to be a closed loop system supplying a multiplicity of feeders F, it will be understood that the feed conveyor may also be use to supply feed to a trough feeder system such as is commonly used in cage poultry systems in which the feed conveyor is comprised of section of a feed conduit and sections of open trough feeders.

Figure 3:
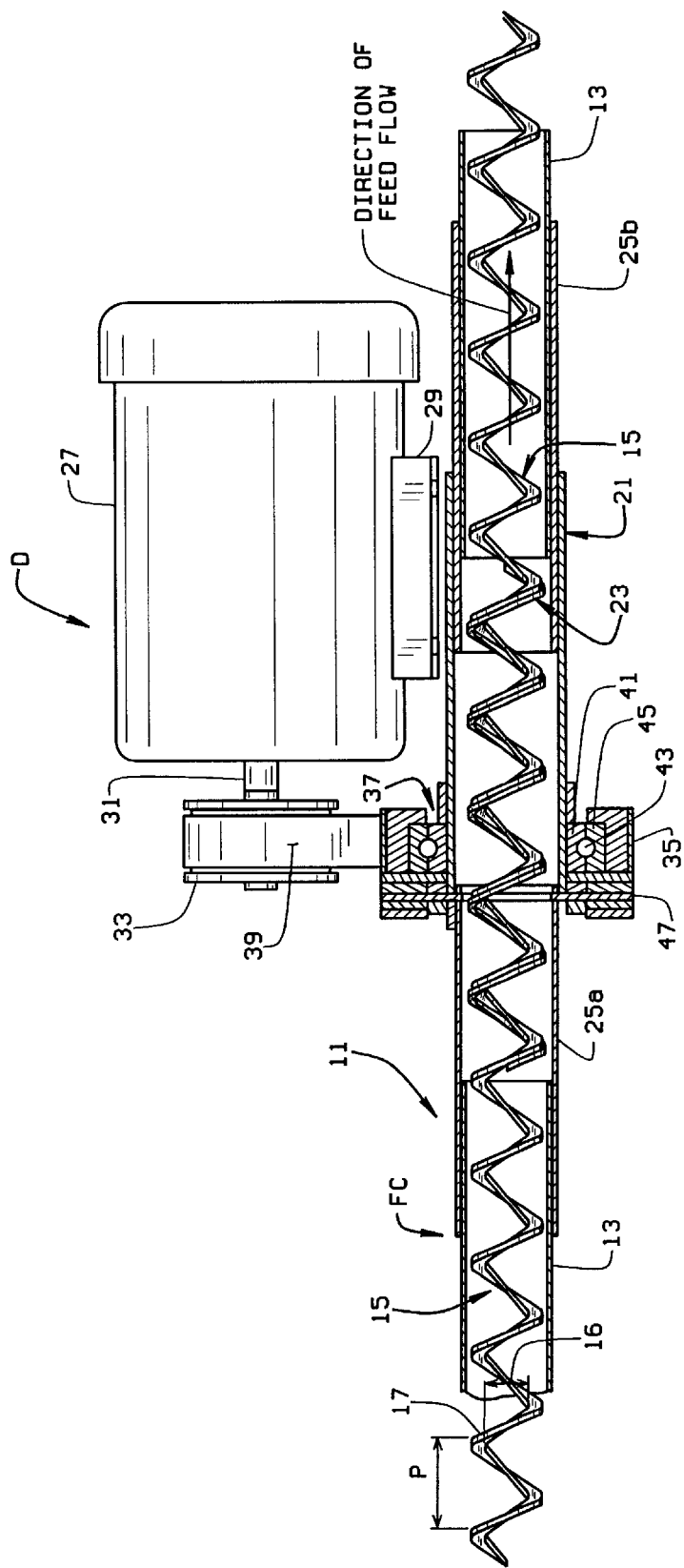
FIG. 3 is view similar to FIG. 2 showing the drive screw in face-to-face engagement with a portion of the feed auger such that the drive screw imparts axial motion to the feed auger upon the drive screw being rotary driven about its longitudinal axis.

Referring now to FIG. 2, feed conveyor FC comprises a feed conduit 11. As shown in FIGS. 2 and 3, feed conduit 11 is a closed tube 13 having an endless feed conveyor auger 15 disposed therewithin. While feed conduit 11 is herein shown as a closed tube, it will be understood that portions of the feed conduit may be formed by one or more open troughs so as to constitute a portion of the trough feeder or the like.

More specifically, feed conveyor auger 15 is an open helical coil (sometimes referred to as a "centerless" auger) preferably formed of hardened steel rod or bar stock or the like. As shown best in FIG. 3, feed conveyor auger 15 has a generally rectangular cross section and has a plurality of substantially equally spaced flights 17 spaced an equal distance from one another at a pitch spacing P of about 1.75" (4.45 cm.). The outer diameter of feed auger 15 is about 1.65" (4.19 cm.). The feed auger 15 is of centerless construction (i.e., it does not have a central shaft) and it has an inner opening or bore 16 extending longitudinally of the auger. The conveyor tube 13 which receives feed auger conveyor 15 may either be of a metal or extruded plastic construction, and may have an inside diameter of about 1.75" (4.45 cm.) such that it is somewhat larger that the outer diameter of feed conveyor auger 15 thereby to permit the feed conveyor auger to readily move within the conveyor tube and to convey loose feed axially through the conveyor tube. The above-noted dimensions of auger 15 and tube 13 are merely for illustrative purposes, and those skilled in the art will recognize that augers of different pitches and diameters may be readily used with the drive of this invention, as hereinafter described.

As described above, feed conveyor FC is arranged in an endless loop and thus feed conveyor auger 15 is also an endless loop construction. Of course, it is not practical to make a one-piece feed conveyor auger in an endless loop and thus it is made of one of more sections or segments which are joined together in an end-to-end co-axial relation. The auger segments may be joined together in a number of ways including brazing or welding of the segments, or the segments may be connected by means of an auger connector or coupler of the present invention, as generally indicated at 19. This coupler has the advantage that the coupler acts to mechanically couple a few of the overlapped flights of the auger segments together so as to distribute the coupling loads in contrast with the point loading when welding or brazing is used to couple the auger segments. Further, the coupler 19 may be readily and repeatedly opened and closed so as to permit disassembly of the endless auger loop to thus enable the changing of drive belt for the drive D. Also, coupler 19 will readily move past the driving elements of drive D without interference. A detailed discussion of the auger connector 19 and its operation will be hereinafter described. While such a coupler is preferred, it has been found that such couplers or welding of the auger sections may not be necessary with the drive of the present invention because the flights of the auger segments are overlapped with one another, such overlapping of the flights mechanically and frictionally engage one another so as to secure the auger segments together within the feed conveyor.

In accordance with this invention, drive D for conveyor FC may be used to either propel feed conveyor auger 15 in axial direction through conveyor tube 13, or drive D may be utilized to rotatably drive feed conveyor auger 15 about its longitudinal access within conveyor tube 13 so that the auger operates as a conveyor screw to screw convey feed axially within the conveyor tube. However, as described in detail in this specification, drive D is utilized to axially move or propel feed conveyor auger 15 through the conveyor tube. The manner in which drive D may be utilized to rotatably drive feed conveyor auger 15 within the tube will be described in a later portion of this description.

Referring now to FIG. 2, feed conveyor auger drive D of the present invention comprises a drive tube, as generally indicated at 21, having a drive screw 23 located therewithin. As shown, drive screw 23 is a relatively short (about 6 flights) segment of open coil, helical auger construction preferably having substantially the same (but not necessarily identical) pitch and flight cross section as feed conveyor auger 15. In some instances, it may be preferred that the pitch of the drive screw be only slightly greater than the pitch of the feed auger. Like feed auger 15, drive screw 23 is a centerless auger segment and it does not have a center shaft. Drive screw 23 has a somewhat larger center opening than the center opening 16 of auger 15. In addition, the outer diameter of the drive screw is preferably (but not necessarily) somewhat larger that the outer diameter of the conveyor auger. However, it will be understood that drive screw 23 may have a different flight cross section than auger 15. Drive screw 23 is connected to drive D in a manner as will appear such that the drive screw may be rotated about its longitudinal axis within drive tube 21 for the purpose of engaging feed conveyor auger 15 and for axially propelling (or for rotatably driving) the feed conveyor auger relative to the drive screw within feed conduit 11 thereby to axially convey feed along the feed conveyor FC from the feed hoppers FH to the various feeders F located along the feed conveyor. As shown in FIG. 3, drive screw 23 and conveyor auger 15 are arranged within drive tube 21 such that drive screw 23 and the portion of auger 15 within the drive tube are substantially coaxial. However, it will be recognized that, within the broader aspects of this invention, in order for drive screw 23 to drive auger 15, the drive screw may only be substantially parallel to the axis of the conveyor auger and may be somewhat axially displaced from the axis of the conveyor auger so long as at least a portion of the flights of the drive screw is in driving engagement with a portion of the flights of the auger. It will be further recognized that the drive screw need not be parallel to auger 15 so long as the drive screw drivingly engages the auger in the same manner as a screw (worm) drivingly engages a worm gear.

Figure 23:
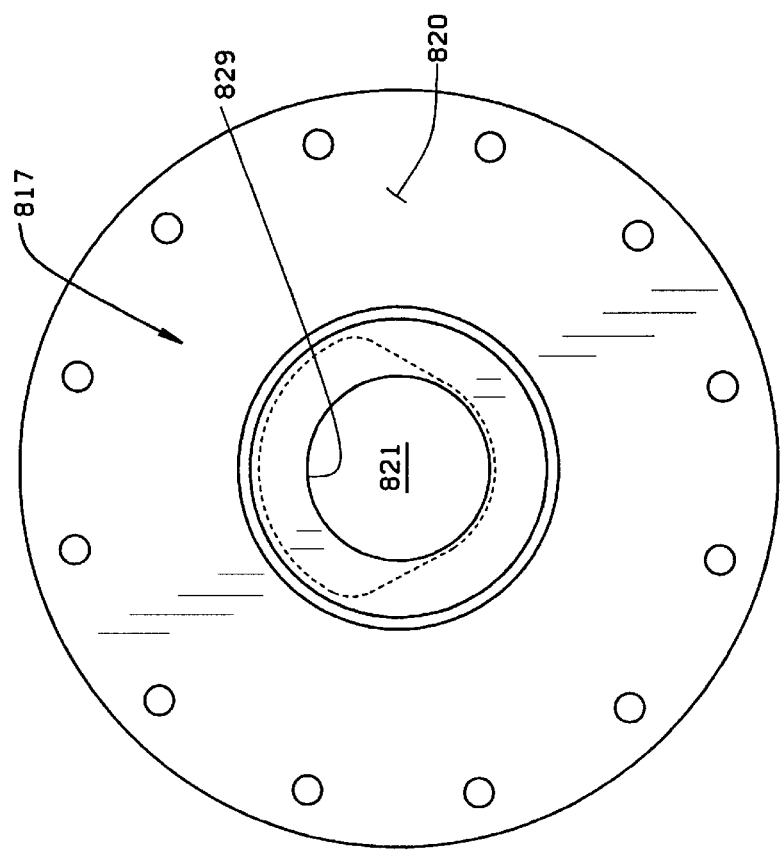
FIG. 23 is an end elevational view taken along line 23—23 of FIG. 22 illustrating a casting having an eccentric chamber therein for accommodating an increase in the volume of the feed carried by the auger as the latter encounters the drive screw and for regulating the amount of feed carried by the auger downstream from the drive so as to insure that the feed conduit downstream from the drive is not overfilled with feed and so as to inhibit the tendency of the of the auger to become overfilled or to jam within the feed conveyor conduit.
Figure 22:
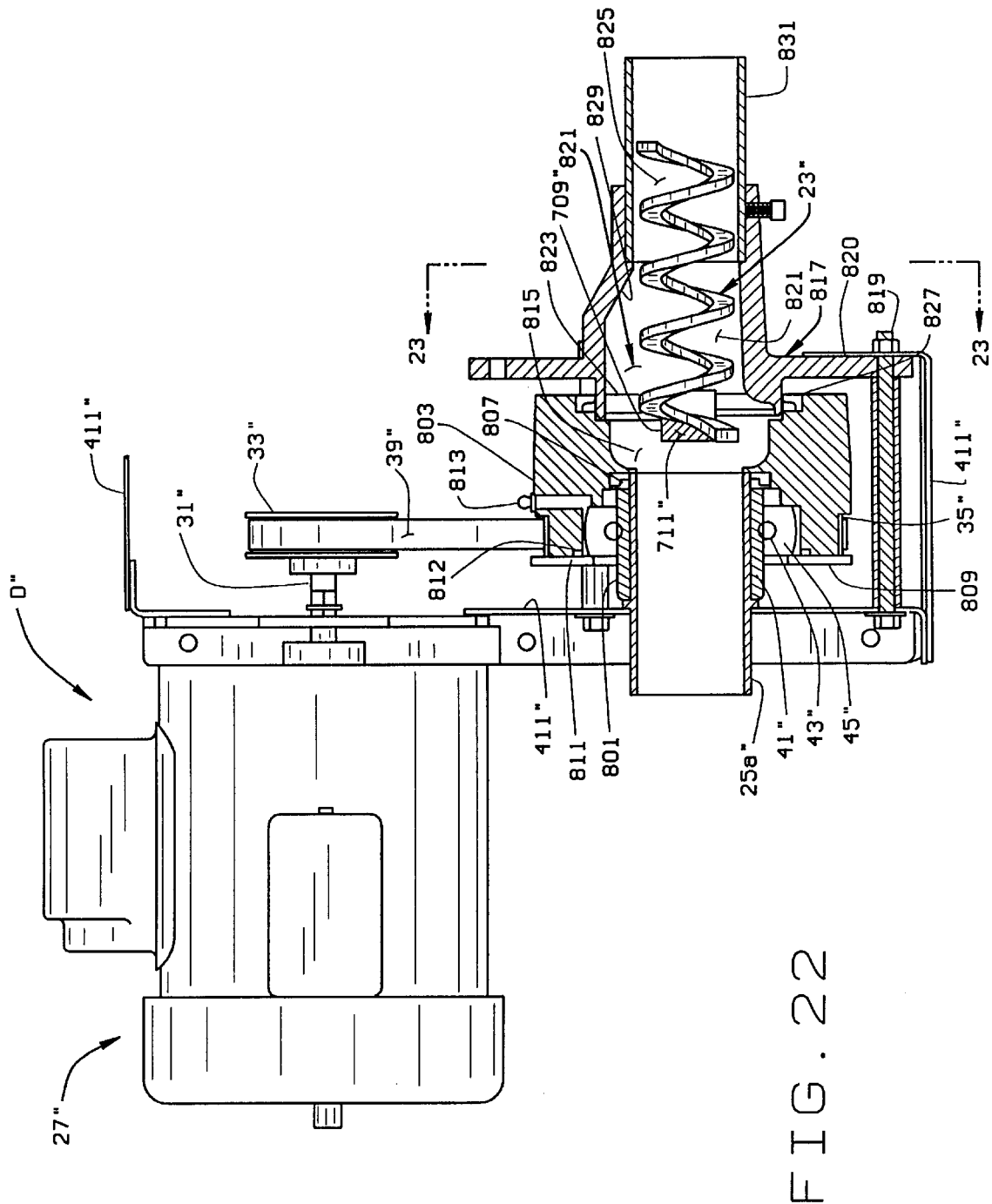
FIG. 22 is a side cross sectional view (with certain parts broken away for purposes of clarity) illustrating still another embodiment of the drive of the present invention.

As shown in FIGS. 2 and 3, an inlet transition tube 25a connects the conveyor tube 13 upstream from drive D to drive tube 21 at the inlet end of the drive tube, and an outlet transition tube 25b connects the outlet end of the drive tube to the conveyor tube 13 downstream from the drive. Specifically, each transition tube 25a, 25b has an inner diameter somewhat larger than the outer diameter of the conveyor tube 13 so as to telescopically receive conveyor tube 13 therein. Further, transition tubes 25a, 25b each have an outer diameter of such dimension which may be telescopically received within the inner diameter of drive tube 21. Thus, the inner diameters of the transition tubes are somewhat larger than the inner diameter of conveyor tube 13, and, likewise, the inner diameter of drive tube 21 is larger than the outer diameter of the transition tubes. In a manner as will hereinafter be more fully described, these variations in the diameters of the conveyor tube, transition tubes, and the drive tube aid in conveying feed that may be compacted through the drive D of the present invention while eliminating or lessening the likelihood of feed carried by the conveyor auger from becoming overly compacted within feed conveyor FC and thus possibly causing jamming of auger 15 within feed conduit 11. In fact, it has been found desirable to provide an eccentric chamber within drive (as shown in FIGS. 22 and 23 and as will be hereinafter described) to minimize the tendency of the feed to compact within the drive of the present invention.

Referring to FIGS. 2 and 3, drive D is shown to comprise an electric motor 27 of suitable size (e.g., a ½ horsepower electric motor for each 120 feet of conveyor length in a cage system with trough feeders) which is stationarily mounted with respect to drive tube 21 by a suitable mounting bracket or fixture 29. It will be understood that drive tube 21 is also carried by bracket 29 such that force may be transferred between drive D and the feed conveyor FC. Motor 27 has a direct drive output shaft 31 (i.e., there is no need for a speed reducer gear set between the output shaft of the motor and the drive shaft) which carries a toothed drive pulley or sprocket 33. A toothed driven pulley or sprocket 35 is carried on drive tube 21 by means of an anti-friction roller bearing 37. A toothed belt 39 is entrained around drive pulley 33 and driven pulley 35 for rotatably driving the driven pulley 35 about the longitudinal centerline of drive screw 23. Of course, the difference in diameters of drive sprocket 33 and driven sprocket 35 determine the speed reduction (or speed increase) between the speed of the output shaft 31 of motor 27 and drive screw 23. For example, the drive sprocket 33 may have about one third the number of teeth as the driven sprocket 35 such that the driven sprocket rotates at only about one third the speed of drive sprocket 33 and of the output shaft 31 of motor 27. Thus, the speed at which drive screw 23 is driven may be varied by changing the ratio of the diameters of sprockets 33 and 35.

Because drive motor 27 is connected to driven sprocket 35 by means of a belt drive, the drive motor can be oriented in any desired position with respect to drive tube 21 so long as drive shaft 31 of motor 27 is generally parallel to the drive tube. It will be further recognized that one motor may be used to drive two or more auger conveyors so long and the sections of the two auger conveyors are parallel to one another. This would be particularly advantageous in poultry cage feeding system where the cages are in stacked relation to one another and several of the auger feeders run in generally parallel relation to one another. By requiring only a single motor to drive several of the feed conveyors, the cost and complexity of the feed conveying system can be reduced.

As noted, bearing 37 is interposed between driven sprocket 35 and drive tube 21 such that the driven sprocket is journalled for rotation on the outside of the stationary drive tube. More specifically, bearing 37 is preferably a suitable ball or roller bearing having an inner race 41 fixably secured to the outer diameter of drive tube 21 such that neither the drive tube nor the inner race rotate. The bearing 37 further comprises an outer race 43 surrounding inner race 41 and supported relative inner race by means of roller elements 45. Preferably, bearing 37 is a roller bearing suitable for transmitting both rotary motion from driven sprocket 33 to drive screw 23 and for transferring axial thrust from the drive screw to drive tube 21.

Driven sprocket 35 is fixedly mounted to outer race 43 by means of bolts (not shown). A drive plate 47 is also secured to driven sprocket 35 such that the driven sprocket and the drive plate are rotatably driven relative to drive tube 21. In a manner as will appear, drive plate 47 is connected to drive screw 23 such that the drive plate causes drive screw 23 to rotate about its longitudinal axis.

Figure 9:
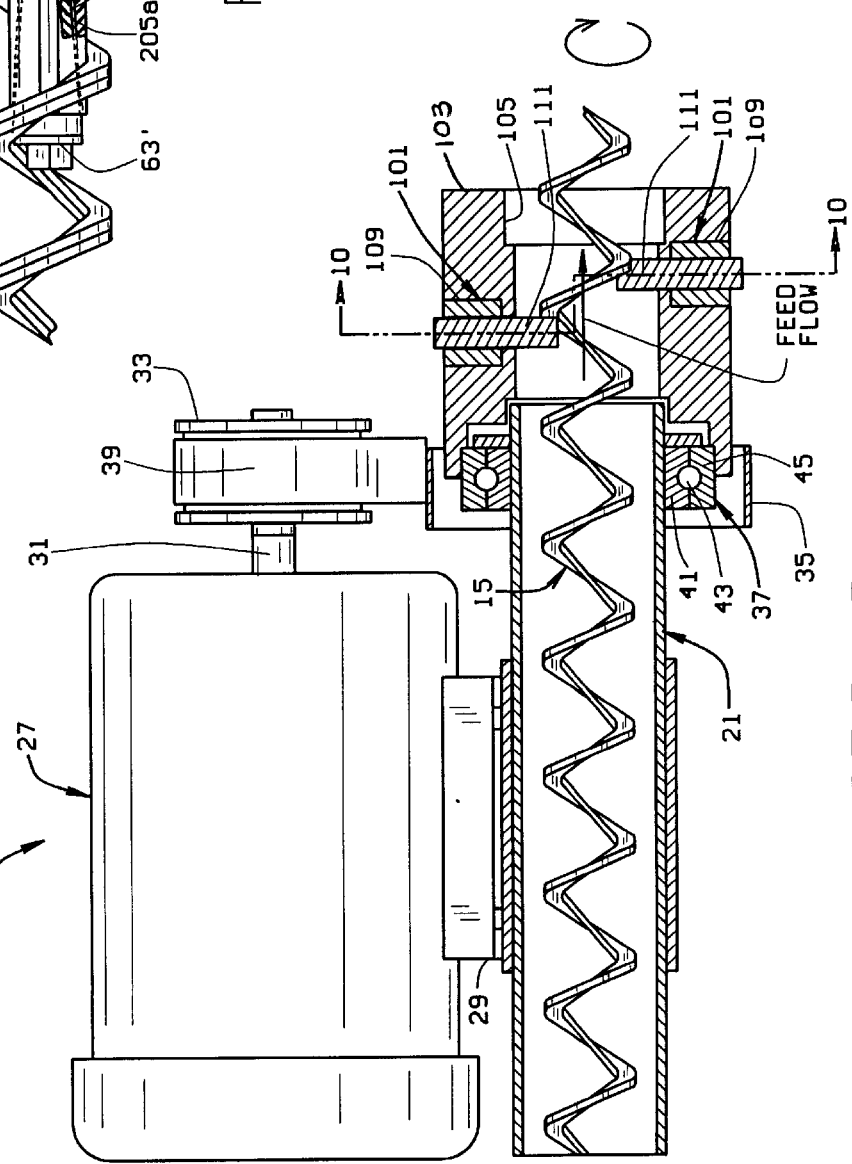
FIG. 9 is a view similar to FIG. 2 illustrating another embodiment of the drive of the present invention in which the drive member comprises bearing followers extending into the conveyor conduit and engaging the conveyor auger with the bearing followers being rotary driven about the longitudinal axis of the auger so as to impart either an axial or a rotary driving force to the auger conveyor.

Referring to FIG. 4, drive plate 47 is shown to have an inner opening 49 centrally located therein through which drive screw 23 is received. Drive plate 47 further has a drive tab 51 which extends into central opening 49 and which is formed relative to the plane of drive plate 47 such that drive tab 51 generally matches the helix angle of drive screw 23, as best shown in FIG. 2. Drive tab 51 engages the downstream face of one of the flights of drive screw 23. The drive tab is secured, preferably by welding, to the drive screw. Thus, upon energization of motor 27, drive plate 47 is rotated with the driven pulley 35 so as to rotate about the longitudinal centerline of drive screw 23. With drive tab 51 fixedly mounted to the drive screw 23, the drive screw is held in generally centered relation within drive tube 21 and the drive screw is rotatably driven about its longitudinal axis. It will be further noted that, preferably, drive tab 51 is located on the back or upstream face of one of the flights of drive screw 23 such that the welds between tab 51 and the drive auger 23 serve primarily to impart rotary motion between the drive tab and the drive screw. Axially thrust is primarily transmitted from the drive screw to the drive tab by the face to face engagement between the back face of the drive screw and the drive path. Within the broader aspects of this invention, it will be appreciated that a variety of attachment means other than a welded drive tab may be utilized to innerconnect the driven pulley 35 to the drive screw. In accordance with this invention and as disclosed in detail hereinafter, drive members other than drive plate 47 and drive tab 51 may be used to drive screw 23. For example, those skilled in the art will recognize that screw and friction connections between a drive plate (or other drive member) and the drive screw may be so utilized. Still other connections between the drive and the drive screw are illustrated in FIGS. 9, 20 and 22.

As shown in FIG. 3, endless feed conveyor auger 15 extends through drive tube 21. The upstream faces (relative to the direction of the feed flow shown in FIG. 2) of the flights of drive screw 23 are in face-to-face engagement with the upstream face of feed conveyor auger 15 such that as the drive screw is rotatably driven about its longitudinal axis, the drive screw propels the feed conveyor auger in axial direction through the drive tube and through feed conduit 11. On each rotation of the drive screw, the drive screw axially propels the feed conveyor auger 15 through an axial distance substantially equal to the pitch of the drive screw. In this manner, feed conveyor auger 15 is axially driven through the feed conduit and around the endless loop feed conveyor FC. Of course, as the feed auger 15 is driven axially through the conduit, the flights of the auger act as scrapers and move feed axially within the feed conduit.

As previously noted, the outer diameter of drive screw 23 is preferably somewhat greater than the outer diameter of the conveyor auger 15. Because the drive screw and the feed auger have substantially the same pitch, the rotating drive screw tends to center auger 15 within the drive screw. As shown in FIG. 3, because the auger 15 is substantially centered with respect to drive screw 23, the driving force is applied to auger 15 from all sides thereof by the drive screw such that the drive screw does not apply a substantial side load to the conveyor auger which tends to push the auger laterally toward one side of drive tube 21. Instead, substantially the only force drive screw applies to auger 15 is an axial force which translates the auger 14 axially within the conduit. Because the side force is substantially eliminated, a significant source of drag or friction between auger 15 and the drive tube is eliminated thus lowering the power needed to drive auger 15.

As described in my co-assigned U.S. Pat. No. 5,335,619, which is herein incorporated by reference, continued operation of feed conveyor FC, particularly after feeders F have been filled with a desired amount of feed, may cause the feed within the feed conduit 11 to become over-compacted such that upon termination of operation and subsequent startup of drive D, the drive may not have sufficient starting power to begin moving feed conveyor auger 15 through the feed conduit thus resulting in jamming of the feed conveyor. Of course, jamming of the auger within the conveyor tube 13 is a serious problem because the animals (birds) housed in house H cannot be fed and because to clear the jam it is oftentimes necessary to remove the auger 15 from a long length (perhaps several hundred feet) of the feed conveyor tube 13. My above-noted U.S. Pat. No. No. 5,335,619 describes regulating tube installed within the feed conduit through which a feed conveyor auger 15 must pass. The regulating tube is provided with scraping and metering sections which strip off excess compacted feed from the outside of the feed conveyor auger and which regulate or meter the amount of feed carried by the auger to an amount less than will totally fill the conveyor tube such that a void is formed in conveyor tube 13 downstream from the regulating tube thus positively preventing over-compaction of the feed within the conveyor tube. In turn, this lessen the chances of the auger 15 becoming jammed within the conveyor tube. It is preferred that one or more of such regulating tubes be installed in feed conveyor FC, as indicated at RT in FIG. 1. Such regulating tubes may also be advantageously used in trough feeders supplied with feed by a drive system of the present invention.

As described above, transition tubes 25a, 25b each have a somewhat larger inner diameter than conveyor tube 13, while the inner diameter of drive tube 21 is somewhat larger than the inner diameter than the transition tubes. Thus, as a flight of conveyor auger 15 approaches drive D and as the flight moves from conveyor tube 13 into the downstream transition to 25, the inlet transition tube 25a will have a larger diameter for accommodating the cross-section of both the feed conveyor auger 15 and drive screw 23. As the flight travels from the transition tube 25a into the drive tube, the larger diameter of the drive tube provides an even greater cross section for the feed carried by the flight.

Referring to FIG. 2, it will be noted that drive screw 23 has a lead end 53 and a trailing end 55. It will be appreciated as a flight of conveyor auger 15 enters drive tube 21 and as the conveyor auger flight comes into contact with the lead end 53 of the drive screw, the drive screw will displace and breakup compacted feed carried within the inner bore of the feed auger. Because transition tube 25a and drive tube 23 are somewhat larger in diameter than the outer diameter of the conveyor auger, the broken up feed will thus have space within which to expand. In this manner, substantially all compacted feed moved with the feed auger is broken up as the auger 15 is axially driven by drive screw 23. It will be noted that as the auger flight of auger 15 moves clear of trailing end 55 of drive screw 23 and enters the downstream transition tube 25b, the inside diameter of the downstream transition tube is somewhat smaller than the inside diameter of the drive tube, and, as the feed auger enters the conveyor tube 13 on the downstream side of drive D, the conveyor tube has an even smaller inside diameter than the transition tube 25b. This progressive increase and decrease of the internal diameters of the section of conduit 11 extending through drive D allows the compacted feed to be broken up by the drive screw and allows the feed to reform within the conduit and thus lessens the tendency of the auger 15 to jam in conduit 11. Further, because one or more regulator tubes RT, as described in my above-noted U.S. Pat. No. 5,335,619, is preferably incorporated within feed conveyor FC, it is insured that the amount of feed carried by feed auger 15 will be less than will totally fill feed conveyor tube 15. In this manner, a partial void is maintained within feed conveyor tube 13, even when the feeders F are filled with feed and as the auger 15 repeatedly re-circulates past feed hoppers FH and past the feeders without depositing feed in the feeders. Again, this tends to insure that jamming of the feed auger within conveyor tube 13 will not occur.

As noted above, drive D of the present invention may be used to impart axially movement to feed conveyor 15 relative to conveyor tube 13 such that the feed conveyor moves axially through feed conduit 11. However, as also above noted, drive D of the present invention may also be operated to rotatably drive feed conveyor auger 15 within feed conduit 11 for screw conveying feed in axial direction through the conveyor tube. More specifically, if it is desired to rotatably drive the feed auger, this may be accomplished by securing one end of the feed conveyor auger to a suitable rotary bearing carried at one end of the feed conduit, as shown in U.S. Pat. No. 3,230,933 (which is herein incorporated by reference), or by the bearing 801 shown if FIG. 21 and discussed in detail hereinafter. With the feed conveyor auger held in axial relation with respect to the feed conduit, rotary motion of drive screw 23 will impart rotary motion to the conveyor auger 15 and will cause the auger to rotate about its longitudinal axis so as act as a screw conveyor and to convey feed axial through the feed conduit. It will be appreciated that with the feed auger being rotatably driven by a drive D of the present invention that the feed conveyor FC will preferably not be arranged in an endless loop, but will rather be comprised of runs of finite length.

It will be appreciated that in certain long conveyor runs, it is necessary to break the run such that an additional feed hopper FH and/or an intermediate drive D may be required. It will be further appreciated that these runs need not necessarily be straight line runs, but they can accommodate turns and curves both in horizontal and vertical directions.

Figure 10:
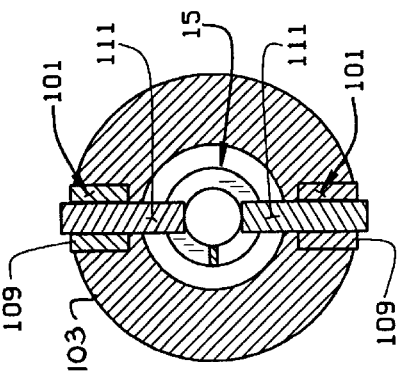
FIG. 10 is a cross sectional view taken on line 10—10 of FIG. 9 further illustrating the bearing followers in engagement with the auger for driving the latter.

As shown in FIGS. 9 and 10, another embodiment of the drive system of the present invention is indicated by its entirety by D'. In drive D', the driving member engaging auger conveyor 15 is shown to be at least one, and preferably two or more pins (or more preferably) bearing followers, as generally indicated at 101, which are carried by a bearing carrier 103 rotatably driven by motor 27 via the belt and pulley arrangement as heretofore described. Specifically, this belt and pulley arrangement is shown to include drive sprocket 33 affixed to drive shaft 31, driven sprocket 35 and belt 39. The driven sprocket 37 is journalled on the stationary drive tube 21 by bearing 37.

Bearing carrier 103 has a bore 105 therethrough which receives a portion of auger 15. One or more bearing followers, as generally indicated at 101, are carried by the bearing carrier which extend inwardly into bore 105 and drivingly engage the back face of an auger flight. Preferably, two or more of the bearing followers 101 are used so as to minimize off center loads from being applied to auger 15 as the later is driven. Bearing followers 101 each comprise a bearing housing 109 mounted within bearing carrier 103 and a bearing finger 111 which extends radially inwardly of carrier bore 103 for driving engagement with auger 15. It will be appreciated that each bearing finger 111 may readily be rotated about its axis relative to bearing housing 109. Bearing carrier 103 is bolted to the outer race 45 of bearing 37 so as to be cantilever supported therefrom and to be rotatable therewith. As noted, each bearing finger 111 is journalled relative to its respective bearing housing 109 for rotation of the bearing finger about its own longitudinal axis. In that manner, with the bearing fingers in driving engagement with the flights of auger 15, the bearing fingers will roll on the auger flights thereby to efficiently drive the auger.

In operation, with bearing carrier 103 rotatably driven in the direction of arrow, as shown in FIG. 9, each bearing finger 111 drivingly engages the back face of auger 15. If auger 15 is free to move axially within conduit 13, the bearing fingers 111 force or drive auger 15 to the right, as shown in FIG. 9. This, in turn, axially propels the auger through the conduit and axially conveys feed along with the flights of the auger. If auger 15 is held in fixed position relative to conduit 13, but is journalled to rotate within the conduit, the bearing fingers will cause the auger to rotate about its center axis and to thus acts as a screw conveyor so as to convey feed axially through the conduit.

Referring now to FIGS. 5–7, auger connector or coupling 19 of the present invention will be described. As shown best in FIG. 5, auger 15 is preferably made up of auger sections (or segments) connected together in axial end to end engagement. Specifically, the ends of the auger sections to be connected together are overlapped about four flights with the faces of the flights of the auger sections being coupled together in face-to-face engagement with one another and with the axes of the auger sections being generally coaxial. Connector 19 is received within the central opening 16 of the auger flights in the area where the auger flights are overlapped.

As best shown in FIGS. 6 and 7, connector 19 comprises an elongate bolt 57 extending through the connector, a sleeve or body 59 of synthetic resin material, preferably an elastomeric material such as urethane, is received on the shank of bolt 57. A split metal tube or cover 61 is disposed on the outside of sleeve 59. Washers 63 are provided at each end of sleeve 59 and a nut 65 is treaded onto the bolt. Shown best in FIG. 6, with a nut 65 in its loosened condition, the urethane sleeve 59 extends out beyond the ends of the split metal sleeve 61. It will be appreciated that, in its unexpanded condition, the outer diameter of cover 61 is less than the inner diameter of the central opening 16 of conveyor auger 15. In this manner, the connector 19 may be readily inserted within auger 15 such that at least one (and preferably two or more) of the overlapping auger flights are engaged by cover 61. With the connector 19 generally in the position shown in FIG. 5, nut 65 is tightened on bolt 57 so as to axially compress urethane sleeve 59. Upon compression of sleeve 59, split 61 is caused to expand in radial outward direction so as to come into a firm gripping engagement with the inner edges of the overlapping auger flights thereby forcefully interconnecting the overlapping auger sections to connector 19 and to one another. Optionally, cover 61 may have a knurled outer surface to enhance the frictional engagement of the cover with the auger flights. Still further, if desired, the outer surface of cover 61 may be provided with spiral grooves (as shown in FIG. 17) which mate with and receive the inner surfaces of the flights of the overlapped auger sections. These helical grooves in the outer surface of cover 61 would receive the flights of the auger sections and would act to securely hold the overlapped auger sections in fixed axial spacing with respect to one another and would prevent slipping of one of the auger sections relative to the other.

It will be appreciated that because connector 19 is disposed inside the inner diameter of auger 15, as the connector moves through feed conveyor FC and through drive units D, drive tab 51 carried by drive plate 47 is located radially outward beyond the outer surface of cover 61 such that no part of connector 19 interferes with drive tab 51. In this manner, connector 19 may readily pass through drive units D without interference.

Figure 8:
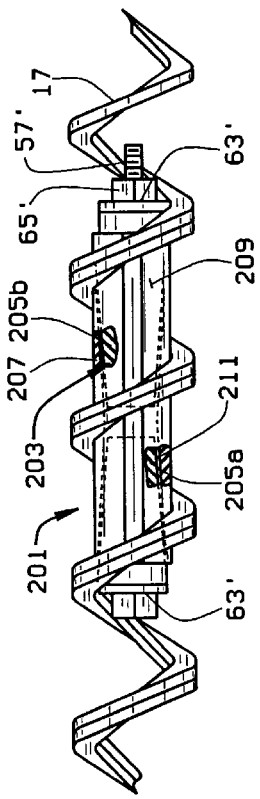
FIG. 8 is a view similar to FIG. 5 illustrating another embodiment of a connector for coupling two auger segments with parts broken away to illustrate the construction thereof.

While connector 19 has been described as having an elastomeric body 59, it will be understood that an equivalent coupler, as indicated at 201 and as shown in FIG. 8, also has an expandable body, as generally indicated at 203, formed by two generally coaxial cones 205a, 205b. Each of these cones has an outer tapered surface 207. Coupler 201 has a split cover 209 which in turn has a dual tapered bore 211 sized such that each of the cones 205a, 205b fits within bore 211. As shown in FIG. 8, coupler 201 is received within central opening 16 of the overlapped auger sections in the same manner as coupler 19, as heretofore described. A bolt and nut similar to bolt 57 and nut 65 heretofore described is installed through central bores in cones 205a, 205b such that upon tightening bolt 57, the cones are moved toward one another. This in turn causes the tapered outer surfaces 207 of the cones to engage the dual tapered bore 211 and continued inward axial movement of the cones to expand the split cover 209 and to grip the inner reaches of the overlapped auger sections thus securely coupling them together.

Referring to FIG. 1, it is shown that two drive units D of the present invention are installed in feed conveyor FC. However, it will be appreciated that the number of drives D required for a particular feed conveyor may depend on the length of the feed conveyor, the diameter of the conveyor conduit, and characteristics of the feed or other material being conveyed by the feed conveyor. Specifically, in certain instances, only one drive unit D may be required wherein other units, two or more drive units would be preferred.

Referring to FIGS. 2 and 3, it will be further appreciated that transition tube 25a may be removably secured to drive tube 21 in any number of manners. As shown in FIG. 2, transition tube 25a and tube 21 are held in alignment and in a spaced relationship with a sufficient gap for rotation of plate 47 with drive tab 51 extending through the gap so as to mate with drive screw 23 and to permit rotation of the drive screw. Alignment of the tubes 21 and 25a is maintained by a series of flanges and spacers or the like with tube 25a being releasable secured thereto. This forms a breakable connection between transition tube 25a and drive tube 21 which allows the transition tube 25a along with conveyor tube 13 downstream from drive plate 47 to be uncoupled from drive tube 21 thus enabling access to both the drive screw 23 and feed auger 15 at that location. A seal 70 is provided between the downstream end of transition tube 25a and retainer plate 69 to prevent feed from leaking at the connection of the transition tube and drive tube 21.

It will be appreciated that with the transition tube 25a uncoupled from the drive tube, if feed auger 15 is slowly moved around feed conveyor FC until one of the auger connectors 19 is in register with drive plate 47, a technician will have access to the auger connector 21 so as to tighten or loosen nut 65 on bolt 57 connector 19 thus allowing the flexible auger sections to be separated from one another. In this manner, it is possible to place a drive belt 39 around driver pulley 33 and driven pulley 35 without having to remove the endless feed conveyor auger from feed conduit 11.

In operation, bulk feed from bulk feed tank BFT, is conveyed to a feed hopper FH generally of the type described in my above noted U.S. Pat. No. 5,335,619. The feed is metered into a feed conveyor FC and the regulating tubes RT described in my U.S. Pat. No. 5,335,619 regulate the amount of feed carried by the feed auger 15 within conveyor tube 13 to an amount less than will totally fill the conveyor tube in the manner shown in the above described U.S. Patent. With the feed auger 15 being propelled in axial direction through conveyor tube 13 by drive D of the present invention, the flights of the feed auger 15 will pick-up feed (or other material) from the feed hoppers FH and will transport or convey such feed in axial direction through the feed conduit. As one of the flights of auger 15 approaches a drive unit D, the flight carrying the feed exits the feed conveyor tube 13 and enters the somewhat larger diameter downstream transition tube 25a. As described above, the larger inner diameter of transition tube 25a provides a somewhat larger cross sectional area for the feed in the transition tube than in the conveyor tube. As the leading end 53 of drive screw 23 engages any compacted feed carried within the core of feed auger 15, the drive screw will tend to breakup and loosen such compacted feed. As the auger flight moves from the downstream transition tube 25a into the large internal diameter of drive tube, the now loosened feed is provided with a sufficient cross-sectional area into which it may expand such that the loosened feed has sufficient space to be conveyed axially through the drive tube without over-compaction and without applying undue frictional loads either to the stationary drive tube or to the rotating drive screw 23. As the auger flight exits drive tube 21, it enters the upstream transition tube 25 which is of somewhat smaller cross-sectional area than the drive tube. However, because the trailing end of the drive screw stops at approximately the downstream end of the drive tube, the cross-sectional area of the transition tube 25b is sufficient to accommodate the loosened feed without re-compacting the loosened feed. Due to the fact that, preferably, a regulating tube RT as described in U.S. Pat. No. 5,335,619 is provided in feed conveyor FC, the amount of feed carried by the feed conveyor is regulated to an amount less than will fill feed conveyor tube 13 so as to insure that a void is provided in the conveyor tube thereby to positively prevent over-compaction and possible jamming of the conveyor auger 15 within conveyor tube 13.

For example, if electric motor 27 operates at a rotational speed of about 1750 rpm, and if drive pulley 33 is about ⅓ the diameter of driven pulley 35, further if the axial pitch of both the drive screw and the feed conveyor auger is about 1.75" (4.44 cm.), the feed conveyor auger 15 will be propelled in axially direction through feed conveyor tube 13 at about the rate of 85 feet/minute (26 meters/minute). However, those skilled in the art will recognize that by varying the ratio of the driven sprocket 35 relative to the diameter of the drive sprocket 33, the axial speed at which the auger is driven by drive D of the present invention may be varied considerably. Generally, for feed conveying applications, the lineal (axial) velocity of the auger being propelled through conveyor tube 13 ranges from about 40–150 feet/minute (12–45 meters/minute), depending on a number of factors.

It will be appreciated by those skilled in the art that the speed with which the auger 15 may be axially propelled through conveyor tube 13 may be readily changed merely by changing the ratio of diameters of the drive pulley 33 relative to the driven pulley 37. This may be done without the necessity of an expensive gear motor or other drive.

It will also be recognized that the helical open coil construction of conveyor auger 15 acts somewhat as a spring to take up slight timing differences between the start up of two or more of the drive units D in a feed convey system FC without causing damage or undue stress to the feed conveyor or the drives. It will also be appreciated that as the feed being conveyed by the feed auger is unloaded in one of the feeders F one after another along the length of feed conveyor FC over a relatively long line of feeders, it will require less force to axially propel the a lightly loaded section of the auger through the conveyor tube than a fully loaded section of auger. Thus, as the auger transports progressively less and less feed down the length of the feed conveyor system, the open coil construction of the auger will permit a slight stretching and shrinking of the spacing between the auger flights and the drive D of the present invention will accommodate such pitch variations.

It should be particularly recognized that one of the advantages of the drive unit D of the present invention is that the feed auger is contacted over a substantial length (i.e., of the entire length of drive screw 23) so as to impart the driving force over a considerable length along the conveyor auger. This results in less impact loading of the conveyor auger than was experienced with gear drive systems and lessens wear on both the drive screw 23 and on the auger 15.

It will be further understood that the drive D of the present invention applies a uniform axial load to auger 17 such that the auger is not subjected to substantial side loads at the location that it is in engagement with drive screw 23. In contradistinction, in gear drives for axially propelling augers through a conveyor tube, such as is shown in U.S. Pat. No. 4,640,230, the drive gear applies both a side and an axial load to the auger. It has be found that the side load causes the flexible auger to deflect away from the gear drive of such prior art gear drive systems and to rub against the conveyor tube opposite the drive wheel. This causes increased friction of the auger within the conveyor tube.

While the conveyor FC was heretofore described as a feed conveyor for conveying feed in a poultry or hog house, it will be understood that the drive D may be used an many types of auger conveyors to convey most dry, granular or powdered materials. For example, drive D may be used in an auger conveyor to convey plastic pellets from a bulk bin to plastic molding machines or the like.

While the drive has been described where drive screw 23 is rotatably driven within drive tube 21 to axially propel the auger through the conveyor tube 13, it will be understood that auger 17 may be held by a suitable bearings in a fixed axial position within conveyor tube 13 but in such manner that the auger may rotate about its longitudinal axis. When the drive screw 23 is rotated by the drive D, it will be understood that the auger will be caused to rotate about its longitudinal axis without axial movement of the auger relative to the conveyor tube. In this manner, the auger acts as a rotary screw conveyor to convey feed or other fluent material in axial direction through the conveyor tube.

While the drive D has herein been described to be operable to drive auger conveyor 15 in one direction within the conduit, it will be understood that drive D may be operated in reverse to drive the auger in the opposite direction within the conduit.

Referring now to FIGS. 11–12, another embodiment, as generally indicated at 301, of a connector for connecting two different auger segments, 15a, 15b together is illustrated. As shown in FIG. 11, the auger segments 15a, 15b have approximately three flights thereof which overlap with one another with the flights of each auger section being in generally face to face engagement. Connector 301 includes an outer cylindrical housing 303 which is adapted to be inserted into the snugly received by the inner diameter of the flights of auger sections 15a, 15b. In accordance with this invention, connector 301 has a pair of opposed clamping members 305a, 305b which, respectively, engage the outer faces of respective auger segments 15a, 15b and forcibly draw the auger segments toward one another in face to face clamping engagement. In this manner, the friction between the auger segments along with such face to face engagement of the auger sections with one another and the positive mechanical interlock with the clamping members 305a, 305b serve to securely couple the auger segments together.

Further in accordance with this invention, connector 301 has a selectively operable clamping mechanism, as generally indicated at 307. The clamping mechanism comprises a through bolt 309 which extends through connector body 303 generally coaxial with respect to the auger section. A nut 311 is threaded on the end of bolt 309. The head of bolt 309 and nut 311 bear on force transmitting sleeves 315a, 315b disposed within connector body 303. Each of these force transmitting sleeves has a bore therethrough which receives the bolt shank 309. It will be appreciated that upon tightening nut 311 on bolt 309, the force transmitting sleeves 315a, 315b are forced axially inwardly of connector body 303 and force clamping members 305a, 305b to bear against the outer faces of the overlapped auger segments 15a, 15b to draw them into firm fact to face compression with one another in such manner as to forcibly clamp the overlapping auger sections together.

Figure 14:
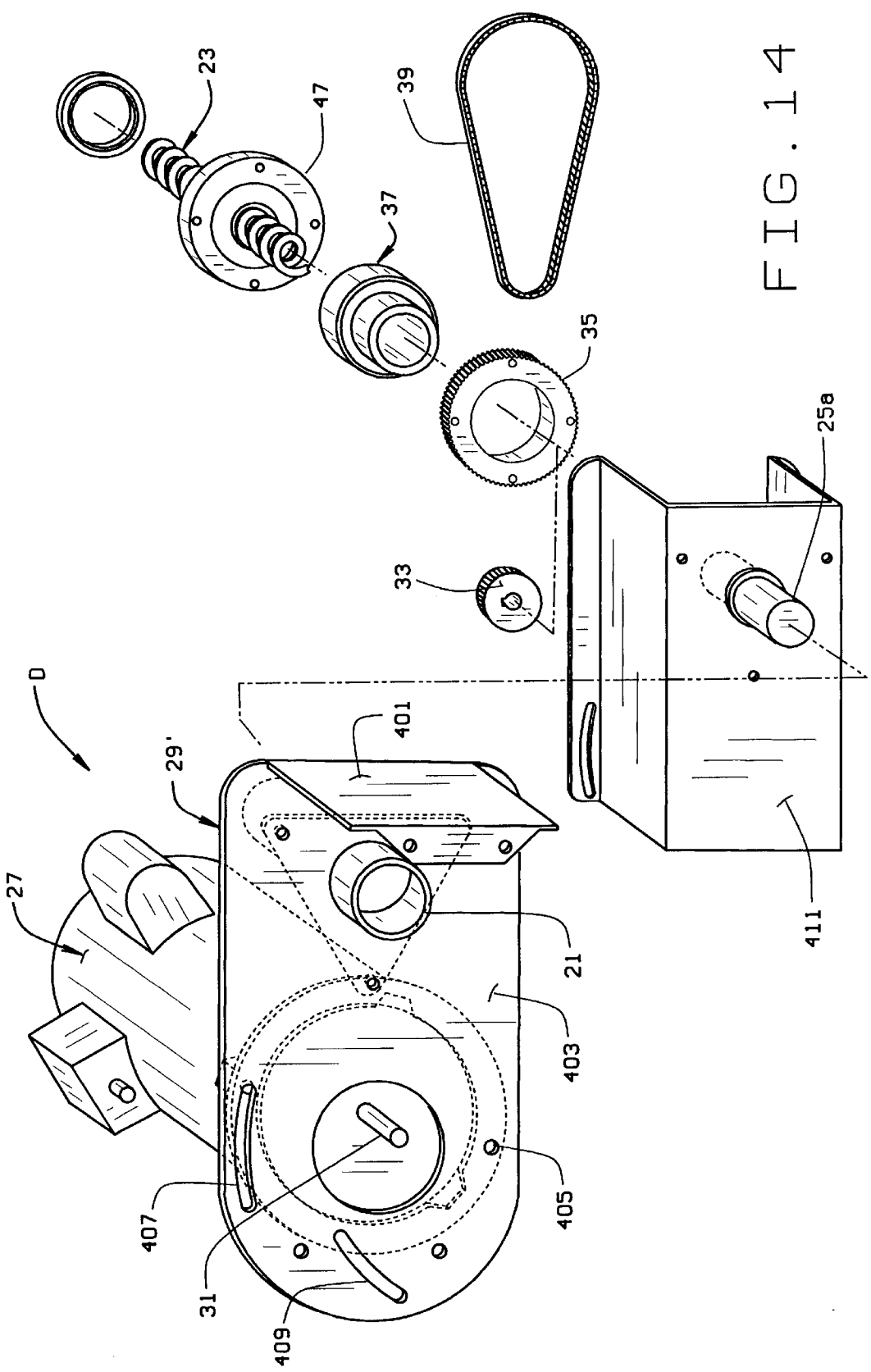
FIG. 14 is an exploded perspective view illustrating a mount for the drive motor relative to the auger drives shown in FIGS. 2, 3, or 9 permitting adjustment of the motor relative to the auger for tensioning the drive belt.

Referring now to FIG. 14, a variation of the mounting structure for drive D is shown which is somewhat different from that shown in FIGS. 2 and 3. More specifically, this alternative drive mounting arrangement includes a mounting bracket or fixture as generally indicated at 29' having a flange 401 which may be mounted to a suitable stationary structure or the like (not shown). The mounting bracket 29' includes a plate like body portion 403 which extends from bracket 401 and which carries electric drive motor 27. Mounting plate 403 includes a hole 405 for receiving a mounting bolt (not shown) extending from motor 27. Further, plate 403 has an elongate slot 407 and 409 which receives another mounting bolt (not shown) extending from the motor. It will be appreciated that with a mounting bolt installed in hole 405, the motor may be rotated relative to an axis extending through hole 405 with the mounting bolt received in elongate slot 407 and 409. When the angle of the motor has been adjusted such that belt 39 is properly tensioned, the bolts in slots 407 and 409 may be tightened so as to firmly hold the motor is its desired position. In this manner, output shaft 31 of motor 27 is also swung in an arc relative to hole 405 thereby enabling adjustment of the tension of drive belt 39.

Figure 15:
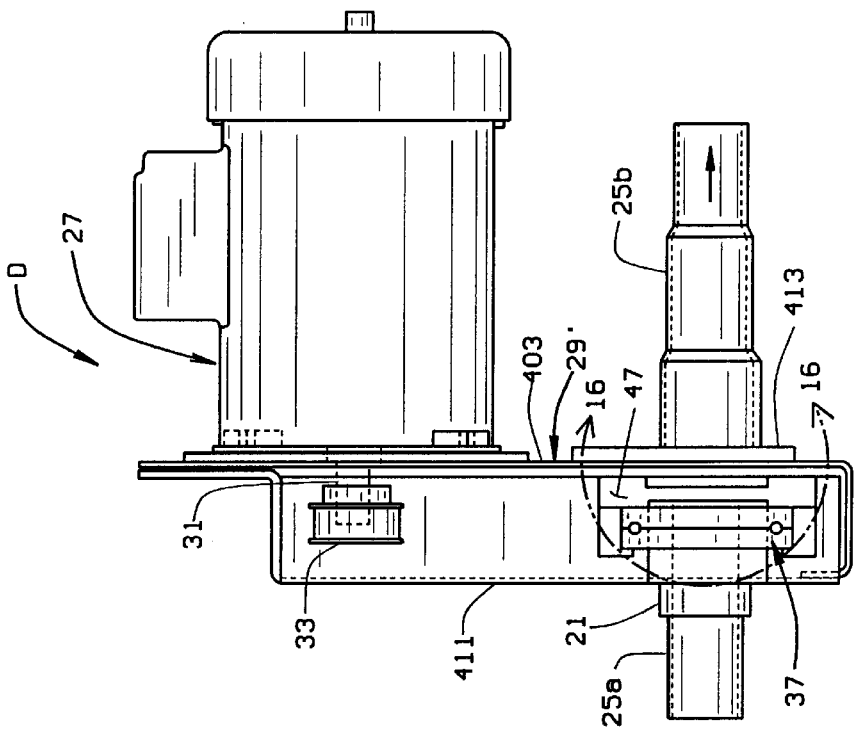
FIG. 15 is a top plan view of the motor mount and the auger drive components shown in FIG. 14 in their assembled positions relative to one another.

Plate 403 further carries drive tube 21. In the manner heretofore described, bearing 37 is carried by the interior section of tube 25a which in turn has driven sprocket 35 and drive member 47 fixed to the moveable race 45 of bearing 37 so as to rotate drive screw 23 about its longitudinal axis so as to effect axial propelling of auger 17 through drive D. Further, a cover or enclosure 409 is provided for enclosing drive sprocket 33, drive belt 39 and driven sprocket 35. As shown best in FIG. 15, the transition tube 25b is welded to a plate 413 which in turn is bolted to the back face of plate 403.

Figure 16:
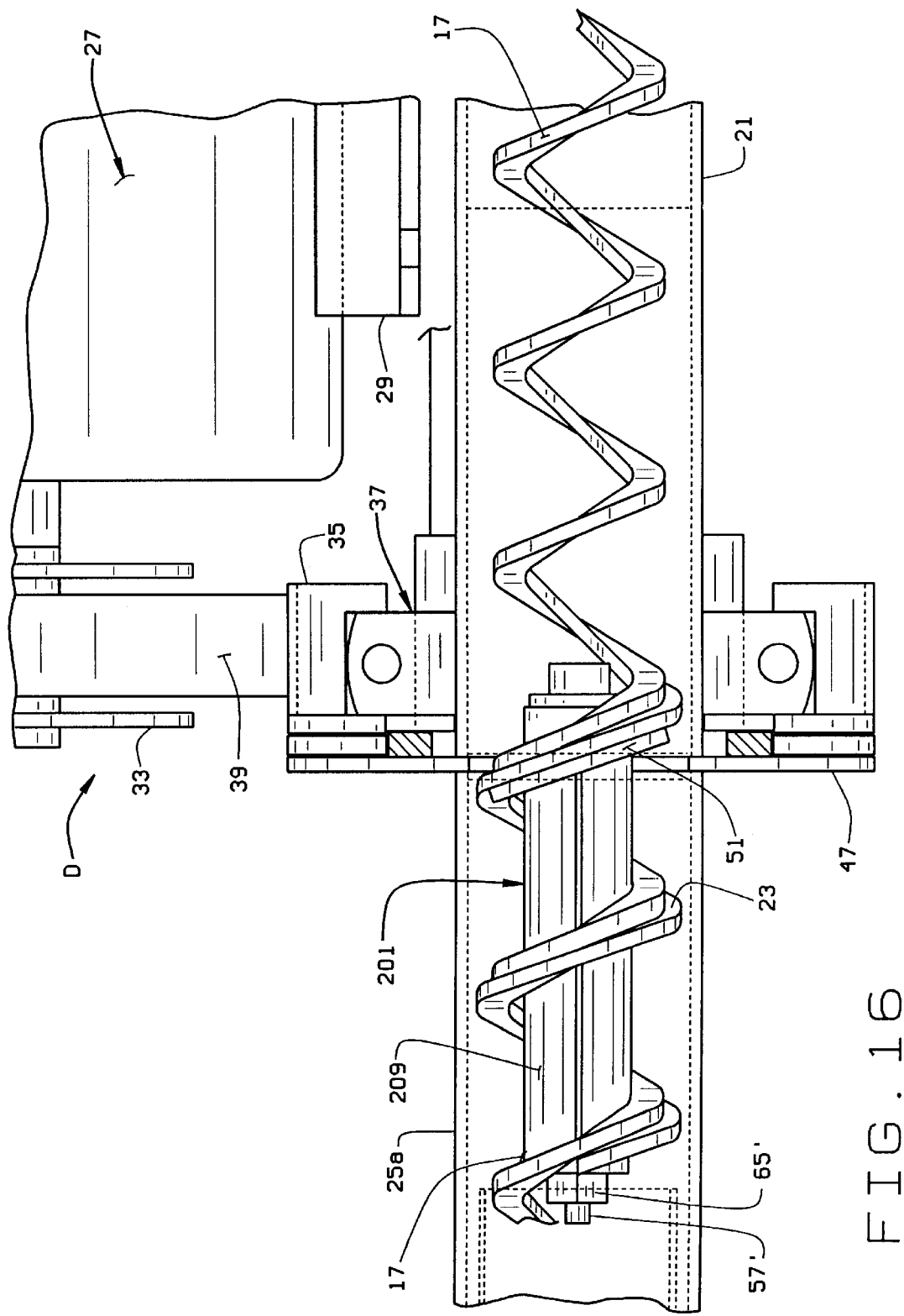
FIG. 16 is a view of a modified version of the drive shown in FIGS. 2 and 3 where the auger is held in fixed axial position with respect to the conveyor tube and is rotated about its longitudinal centerline so as to axially propel feed through the conveyor tube.

Referring to FIG. 16, an enlarged view of a drive D of the present invention is shown in which an auger segment connector 201 is shown as it connects one or more auger sections having approximately three flights in overlapping relation and as it together with the auger section moves axially through the drive arrangement D of the present invention. Specifically, it will be noted that connector 201 together with the overlapping auger sections moves through the drive without interference with the drive member 51. It will be understood that drive D is essentially the same as the drive shown in FIGS. 2–4 heretofore described. However, it will be understood that in the event the conveyor auger is to be rotary driven rather than axially driven, can 201 could be used to lock two conveyor auger sections to drive screw 23 such that upon operation of motor 27, the drive screw and the auger sections are rotated relative to conveyor tube 21. In such cases, the auger 17 is journalled for rotation about its central axis by means of a bearing, as shown in FIG. 21.

Referring now to FIGS. 17–17B, another embodiment of the coupler or connector, as illustrated in FIGS. 5–8 is indicated in its entirety at 601. The coupler 601 has a tubular body 603 having a longitudinal split 605 running lengthwise thereof from one end to the other of the coupler body. This coupler body has raised and spaced apart projections 607a, 607b on the outer surface thereof arranged in a spiral or helix configuration at substantially the same helix angle as that of auger 17 so as to receive the overlapped sections of the auger sections to be joined by coupler 601. Of course, the distance the projections 607a, 607b are spaced apart is sufficient to readily, but snugly receive the overlapped flights of the auger sections when the later are in face to face engagement on the outer surface of the coupler body. As shown in FIG. 17A, the projections 607a, 607b are shown to be provided on opposite sides of split 605 and on the side of the tubular body opposite the slit. As shown in FIG. 17B, a cylindrical body 609 of suitable elastomeric material, preferably urethane, is disposed within the tubular body. This body of elastomeric material has a central bore therethrough which receives a throughbolt 611 similar to bolt 57 described in regard to coupler 19. Upon tightening bolt 57, the elastomeric body 609 is compressed and thus expands in radial direction so as to expand coupler body outwardly into firm engagement with the inner surfaces of the overlapped auger sections. This outward radial expansion also causes the vertical faces of projections 607a, 607b to firmly engage the outer faces of the overlapped auger sections to even more securely hold the auger sections in relation to the coupler than the coupler 19 heretofore described.

The overlapped auger sections 17a, 17b joined together by the coupler 601 of the present invention are shown in FIG. 18 as the overlapped auger section pass through the drive screw 23 of the drive D of the present invention.

In FIG. 19, a combination driven sprocket/bearing assembly, as indicated generally at 701, is illustrated. It will be understood that this combination driven sprocket/bearing is intended to be a unitary member which may be used in place of the separate 35, antifriction (rolling element) bearing 37, and drive member 47 heretofore described and shown in FIG. 14. Preferably, sprocket/bearing/drive member 701 is molded of a suitable synthetic resin material, such as a suitable flouroplastic or polyamide. The drive member has sprocket teeth 703 on its outer periphery to be in mesh with the teeth provided on drive belt 39. At the center of the assembly, a journal bearing, as indicated at 705, is provided which is journalled on the outer surface of drive tube 21. As indicated at 707, the drive member has a pocket 709 which receives a drive member 711, which is shown in FIG. 23. The drive member is preferably made of steel or the like and it has a body 713 which is snugly received within pocket 709 and a finger 715 which extends radially inwardly for engagement with drive screw 23 for being welded thereto. The drive member has a bolt hole 717 in its upper portion for receiving a bolt (not shown) which secures the drive member to the plastic drive sprocket 701.

Referring now to FIG. 21, a length of auger 17 is shown disposed within an auger tube 13. It will be appreciated that this length of auger 17 is not part of an endless loop of auger which is propelled axially around an endless loop, as shown in FIG. 1, but rather is a straight run of auger conveyor and the auger section has ends, one of which is shown in FIG. 21. Specifically, the end of auger 17 shown in FIG. 21 is secured to a rotary bearing, as generally indicated at 801, which holds the auger section in fixed axial position within conveyor tube 13, but journals the auger for rotation about it longitudinal axis. The bearing 801 includes a cap 803 mounted to the end of the conveyor tube 13, a stationary race 805 mounted to cap 803, and a rotary race 807 rotatable with respect to the stationary race. Of course, the end of auger 17 is fixedly mounted with respect to the rotary race 807. It will be appreciated that bearing 801 permits the auger to rotate about its longitudinal axis, but holds the auger in fixed axial position within the conveyor tube and transmits axial loads from the auger to the conveyor tube. It will be further appreciated that if a section of auger 17 passes through the drive of this invention, preferably the drive shown in FIG. 9, the drive members 111 will impart rotary motion to auger 17 such that the auger serves as a screw conveyor to axially propel feed longitudinally through the conveyor tube.

Figure 24:
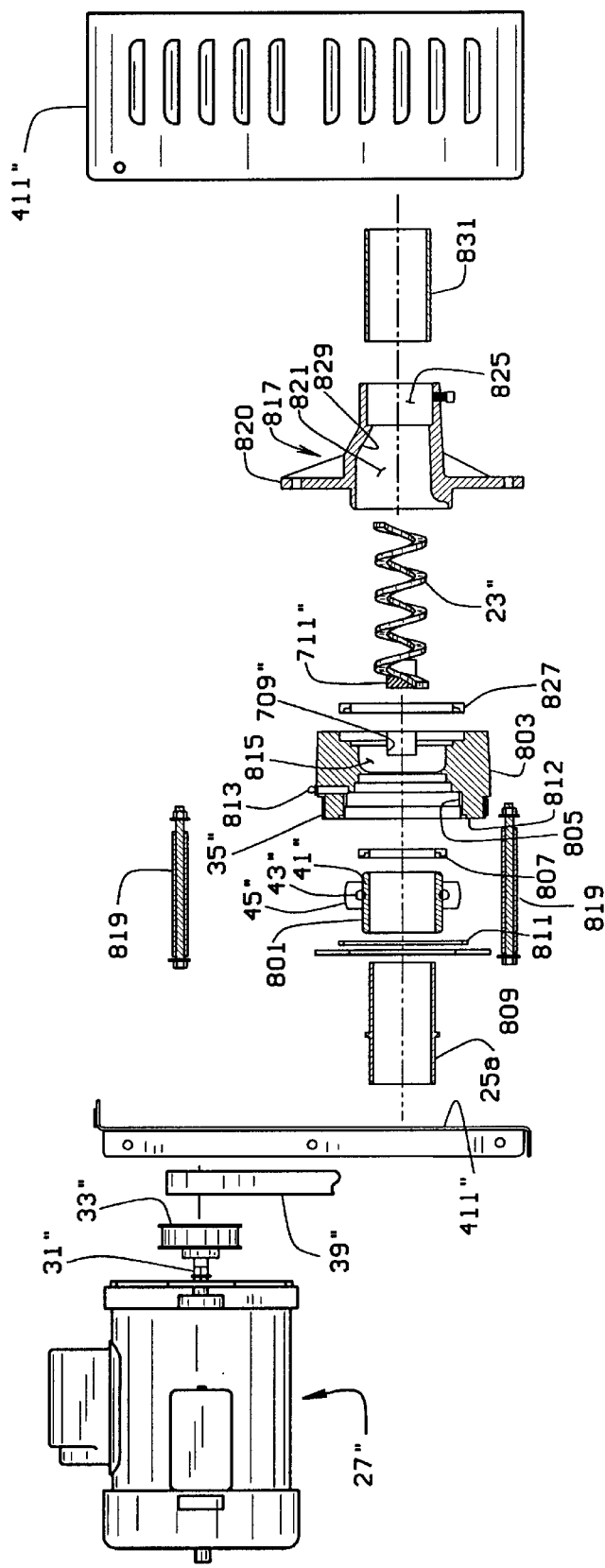
FIG. 24 is an exploded view of the main components of the drive shown in FIG. 22.

Referring now to FIGS. 22–24, still another embodiment of the drive of this invention, as indicated at D", is illustrated. Throughout FIGS. 22–24, reference characters from the other embodiments of the drive of this invention, as shown in the prior drawings, but being "double primed" (as with drive D", above), indicate parts of drive D" having a similar construction and/or function as corresponding parts as the previously described drives. Accordingly, such parts will not be described in detail herein except to the extent needed for a more complete understanding of drive D".

As shown in FIG. 22, a bearing carrier 801 is bolted to a portion of mounting plate 411". This bearing hub carrier 801 is an anti-friction (roller) bearing having in inner race 41", an outer race 45", and rolling elements 43" interposed between the races. A driven hub, as indicated at 803, is rotatably carried on the outer race 45". This driven hub 803 has a bore 805 (see FIG. 24) for receiving outer bearing race 45" with a press fit therebetween. A seal 807 is interposed between the inner face of the bearing race 45" and the inner end of transition tube 25a" so as to seal the bearing from feed transported by the feed conveyor driven by drive D" and to prevent grease lubricating bearing hub carrier 801 from leaking into the feed carried by the feed conveyor. The bearing hub carrier 801 is maintained within bore 805 by means of an outer plate 809 drawn into bearing relation with the end of hub 803 by bolts (not shown). An O-ring seal 811 received in a groove 812 seals the interface between plate 809 and the outer face hub carrier 803 to prevent grease from the bearing from leaking. A grease fitting 813 in the hub carrier 803 allows grease to be forced into the bearing for lubrication purposes.

As perhaps best shown in FIG. 22, a driven sprocket 33" is formed on the outer face of hub 803 so as to have drive belt 39" entrained therearound such that the hub is rotatably driven by motor 27" and such that the hub 803 is journalled by bearing 43" for rotation about the longitudinal axis of drive screw 23".

Hub 803 has a central cavity 815 in its downstream end face larger in diameter than drive screw 23". An axial drive pocket 709" is provided in the side wall of hub 803 defining cavity 815. A drive screw drive member 711" is inserted into drive pocket 709" and is retained therein by bolts or the like such that the drive member is rotatably driven about the axis of hub 803. Drive member 711" is coupled (preferably welded) to the upstream end of drive screw 23" such that the drive screw is held generally in centered relation with the feed conveyor tube and with feed conveyor auger 15 (not shown in FIG. 22) so that upon rotation of hub 803, drive screw 23" is driven in rotary fashion. While not shown in FIG. 22, it will be understood that drive screw 23" is in face-to-face, driving engagement with auger 15 such that upon rotation of the drive screw, the auger will be driven thereby in the manner heretofore described in regard to the other embodiments of the drive of this invention described herein.

An outlet casting, as indicated at 817, is mated to the downstream face of hub carrier 801 by means of connection bolts 819 interposed between a flange 820 on the outlet casting and mounting plate 411". More specifically, outlet casting 817 has an eccentric bore 821 extending therethrough having enlarged inlet opening 823 in register with cavity 815 of the hub carrier for receiving feed therefrom and a smaller cross section outlet opening 825 of smaller cross section at the downstream end thereof for the discharge of feed carried by the feed auger back into the feed conveyor conduit. A seal 827 between the downstream end of hub carrier 801 and outlet casting 817 prevents the leakage of feed at the juncture of the hub and the outlet casting. As shown in FIGS. 22 and 23, a transition shoulder 829 extends down from the upper portion of the outlet casting so as converge the bore of the outlet casting to a diameter (cross section) only slightly larger than the cross section of drive screw 23" thereby to regulate the amount of feed carried by to feed auger to an amount only slightly more than the cross section of the diameter of the drive screw.

As shown, an adapter tube 831 is mounted in the outlet opening 825 of outlet casting 817. The feed conveyor conduit 13 (not shown in FIG. 22) is installed on the outside of adapter 831. Because the diameter of the outlet bore of casting 821 is only slightly larger than the outer diameter of drive screw 23" and because feed auger 15 is generally coaxial therewith and driven thereby, feed carried on the exterior of the feed auger is stripped therefrom as the feed auger enters adapter 831. It will be appreciated that since feed conduit 13 is received on the exterior of adapter 831, the inner cross section of feed conduit 13 is greater than the cross section of adapter 831 such that upon the feed conveyed by auger 15 entering back into the feed conduit 13, the feed will not fully fill the conduit and a partial void will be formed in the feed conduit, in the manner more fully described in my U.S. Pat. No. 5,335,619 (which is herein incorporated by reference), so as to prevent overfilling and possibly jamming of the auger 15 within the feed conduit downstream from drive D".

While the drive D of the present invention has been described in the agricultural field for conveying feed through a feed conveyor in a poultry house, it will be understood that the drive of the present invention may be used with any type of conveyor that is used to convey any dry, flowable lading from one point to another. For example, such dry, flowable materials may be a granular material, a powder, or other fluent or pulverulent material such as cement, plastic pellets, flour, talcum powder, salt, dry chemicals or the like. It will also be appreciated that the drive D may be used to convey feed in a hog rearing house, or the drive may be used to convey plastic resin pellets to plastic molding machines. As used in this disclosure, various terms have been used to described the dry flowable or fluent materials that may be conveyed by the conveyors described in this specification. However, such terms should be understood to include a wide variety of dry (or even slurry-like materials) which are capable of being conveyed by an auger or screw conveyor.

It can be seen that the detailed description of the preferred forms and embodiments of the invention fulfill the objects and advantages set forth above. Inasmuch as numerous modifications may be made to the preferred embodiments without departing from the spirit and scope of the invention, the scope of the invention is to be determined by the scope of the following claims.

What is claimed is:

1. A drive for an auger conveyor, said auger conveyor comprising a conveyor conduit and a centerless auger disposed within said conduit, said auger having a longitudinal axis and a plurality of flights spaced apart from one another at generally equal intervals along said longitudinal axis, said drive comprising a drive member in driving engagement with said auger for driving said auger in axial direction relative to said drive and relative to said conveyor conduit, said drive member being rotatably driven about an axis parallel to said longitudinal axis of said auger, and a power drive for rotating said drive member about said axis such that rotation of said drive member effects axial movement of said auger relative to said conveyor conduit.

2. A drive as set forth in claim 1 wherein said conveyor conduit and said auger are arranged in an endless loop, and wherein said drive member engages said auger and axially propels said auger within said conduit around said endless loop.

3. A drive as set forth in claim 2 further comprising means for holding said auger in fixed axial position within said conduit, but permitting rotation of said auger relative to said conduit, with said drive screw rotating said auger.

4. A drive as set forth in claim 1 wherein said drive member is a drive screw having at least one helical flight in driving engagement with at least one of said flights of said auger.

5. A drive as set forth in claim 4 wherein the flights of said drive screw are in face-to-face engagement with the corresponding flights of said auger.

6. A drive as set forth in claim 1 wherein said auger has a plurality of helical flights disposed at substantially equal intervals from one another along the length of said auger, and wherein said drive member is a drive screw having at least one helical flight in driving engagement with at least one of said flights of said auger.

7. A drive as set forth in claim 6 wherein said drive screw is disposed relative to said auger such that the axis of said drive screw is substantially coaxial with the longitudinal axis of said auger.

8. A drive as set forth in claim 5 wherein said drive screw has a plurality of helical flights spaced longitudinally from one another along the length of the drive screw at substantially the same axial spacing or pitch as the auger and wherein said flights of said drive screw are in driving engagement with said auger so as drive said auger in axial direction relative to said conduit.

* * * * *